US011228899B2

(12) United States Patent
Ou et al.

(10) Patent No.: US 11,228,899 B2
(45) Date of Patent: Jan. 18, 2022

(54) METHOD AND APPARATUS FOR MULTIPLE-USIM DEVICE IN A WIRELESS COMMUNICATION SYSTEM

(71) Applicant: ASUSTek Computer Inc., Taipei (TW)

(72) Inventors: Meng-Hui Ou, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 49 days.

(21) Appl. No.: 16/882,118

(22) Filed: May 22, 2020

(65) Prior Publication Data

US 2020/0396591 A1    Dec. 17, 2020

Related U.S. Application Data

(60) Provisional application No. 62/861,654, filed on Jun. 14, 2019, provisional application No. 62/861,686, filed on Jun. 14, 2019.

(51) Int. Cl.
| | |
|---|---|
| *H04W 68/02* | (2009.01) |
| *H04W 8/18* | (2009.01) |
| *H04W 68/00* | (2009.01) |
| *H04W 76/27* | (2018.01) |
| *H04W 48/16* | (2009.01) |
| *H04W 76/11* | (2018.01) |
| *H04W 24/08* | (2009.01) |
| *H04W 8/08* | (2009.01) |
| *H04W 76/30* | (2018.01) |

(52) U.S. Cl.
CPC ............. *H04W 8/183* (2013.01); *H04W 8/08* (2013.01); *H04W 24/08* (2013.01); *H04W 48/16* (2013.01); *H04W 68/005* (2013.01); *H04W 76/11* (2018.02); *H04W 76/27* (2018.02); *H04W 76/30* (2018.02)

(58) Field of Classification Search
CPC ... H04W 8/183; H04W 68/005; H04W 76/27; H04W 48/16; H04W 76/11; H04W 24/08; H04W 8/08; H04W 76/30; H04W 68/02
See application file for complete search history.

(56) References Cited

U.S. PATENT DOCUMENTS

| | | | |
|---|---|---|---|
| 2017/0359813 A1* | 12/2017 | Lee | ................... H04W 52/0212 |
| 2019/0223132 A1 | 7/2019 | Miao et al. | |
| 2019/0350041 A1 | 11/2019 | Liang et al. | |

FOREIGN PATENT DOCUMENTS

WO    2019161537 A1    8/2019

* cited by examiner

*Primary Examiner* — Said M Elnoubi
(74) *Attorney, Agent, or Firm* — Cooper Legal Group, LLC

(57) ABSTRACT

A method and apparatus are disclosed. In an example from the perspective of a User Equipment (UE) with a first Universal Subscriber Identity Module (USIM) and a second USIM, the UE establishes a connection associated with the first USIM, wherein a UE state corresponding to the first USIM enters connected state. The UE stops monitoring paging in a serving cell for the second USIM based on a time domain pattern derived using a second UE Identifier (UE ID) associated with the second USIM, wherein the stopping monitoring paging is performed when the UE state corresponding to the first USIM is connected state and a UE state corresponding to the second USIM is idle state or inactive state. The UE receives, in a serving cell for the first USIM from a network node, an indication associated with activity for the second USIM via the connection associated with the first USIM.

20 Claims, 20 Drawing Sheets

METHOD AND APPARATUS FOR MULTIPLE-USIM DEVICE IN A WIRELESS COMMUNICATION SYSTEM

CROSS-REFERENCE TO RELATED APPLICATIONS

The present application claims the benefit of U.S. Provisional Patent Application Ser. No. 62/861,654 filed on Jun. 14, 2019, the entire disclosure of which is incorporated herein in its entirety by reference. The present application also claims the benefit of U.S. Provisional Patent Application Ser. No. 62/861,686 filed on Jun. 14, 2019, the entire disclosure of which is incorporated herein in its entirety by reference.

FIELD

This disclosure generally relates to wireless communication networks, and more particularly, to a method and apparatus for a multiple-Universal Subscriber Identity Module (USIM) device in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE) with a first Universal Subscriber Identity Module (USIM) and a second USIM, the UE establishes a connection associated with the first USIM, wherein a UE state corresponding to the first USIM enters connected state. The UE stops monitoring paging in a serving cell for the second USIM based on a time domain pattern derived using a second UE Identifier (UE ID) associated with the second USIM, wherein the stopping monitoring paging is performed when the UE state corresponding to the first USIM is connected state and a UE state corresponding to the second USIM is idle state or inactive state. The UE receives, in a serving cell for the first USIM from a network node, an indication associated with activity for the second USIM via the connection associated with the first USIM.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: SP-190248, "Revised SID: Study on system enablers for multi-SIM devices"; 3GPP TS 38.304 V15.3.0, UE procedures in Idle mode and RRC Inactive state; 3GPP TS 38.413 V15.3.0, NG-RAN; NG Application Protocol (NGAP); 3GPP TS 38.331 V15.5.1, NR RRC protocol specification; 3GPP TS 23.502 V16.0.2, Procedures for the 5G system, Stage 2; RP-191304, "Considerations on multi-SIM study in RAN"; RP-190833, "vivo views on NR Rel-17"; 3GPP TS 36.331 V15.5.1, E-UTRA RRC protocol specification; 3GPP TS 38.300, V15.0.0, NR and NG-RAN Overall Description. The standards and documents listed above are hereby expressly incorporated by reference in their entirety.

Figure 1:
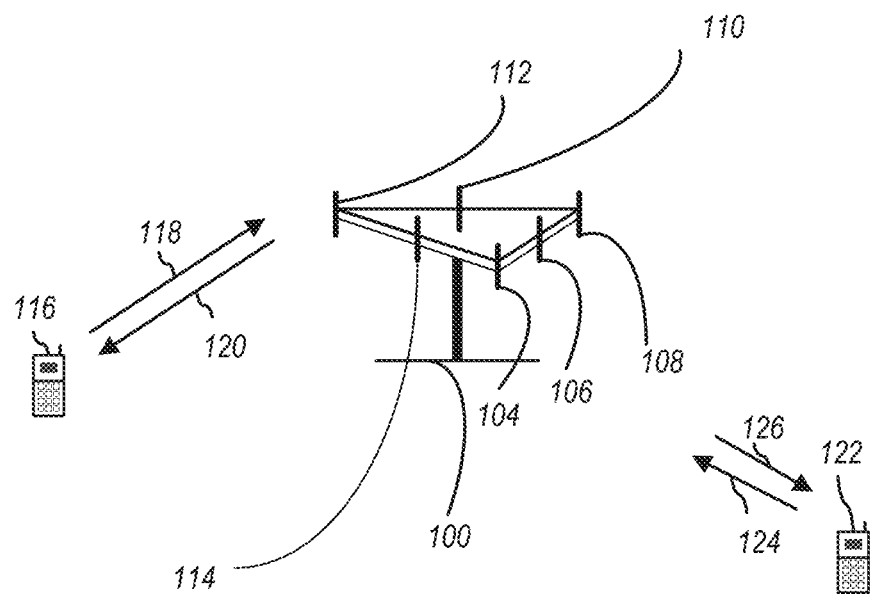
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
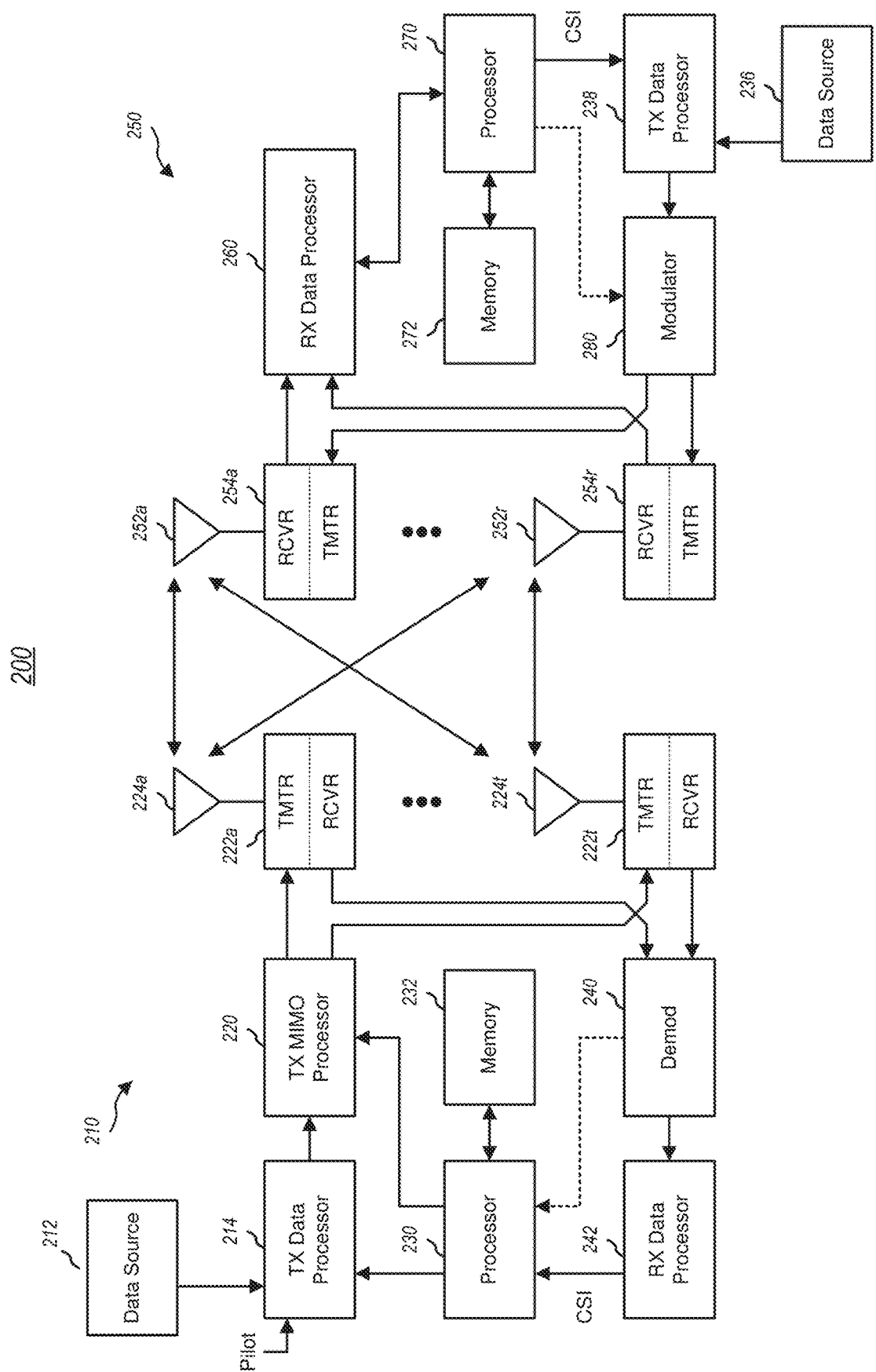
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
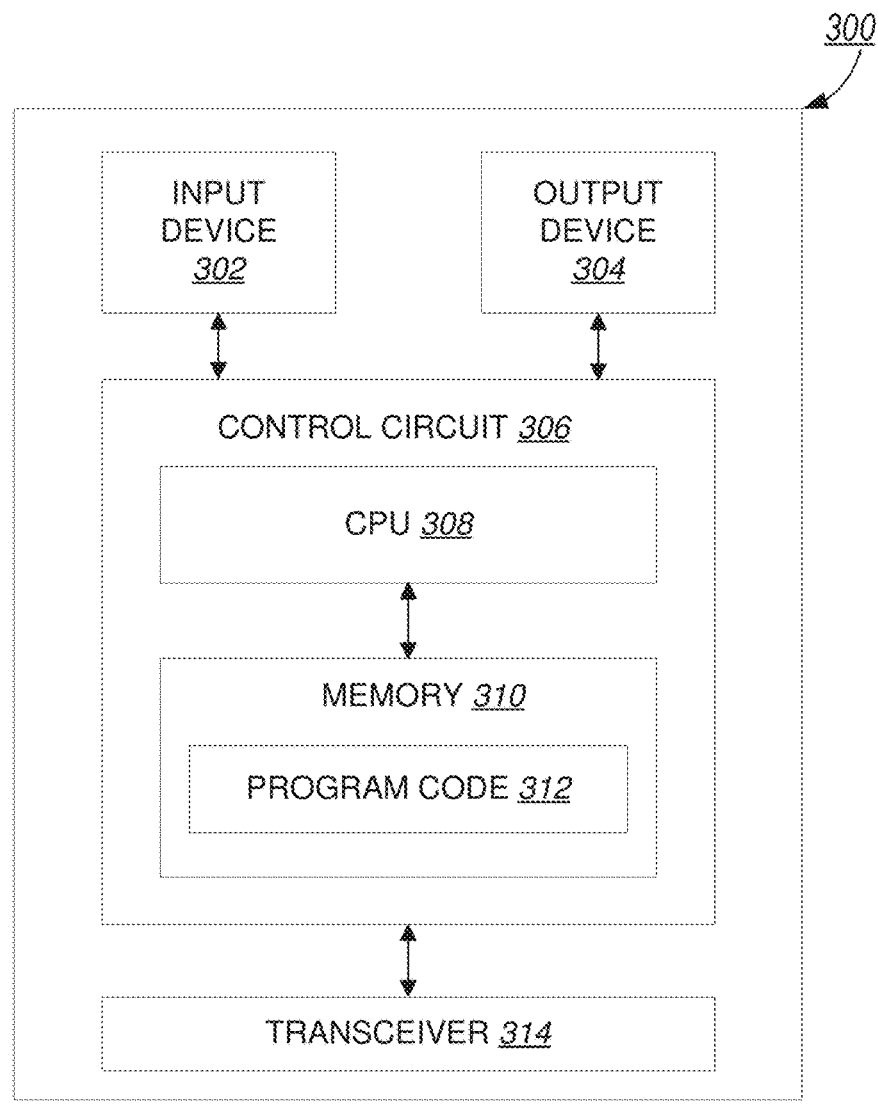
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
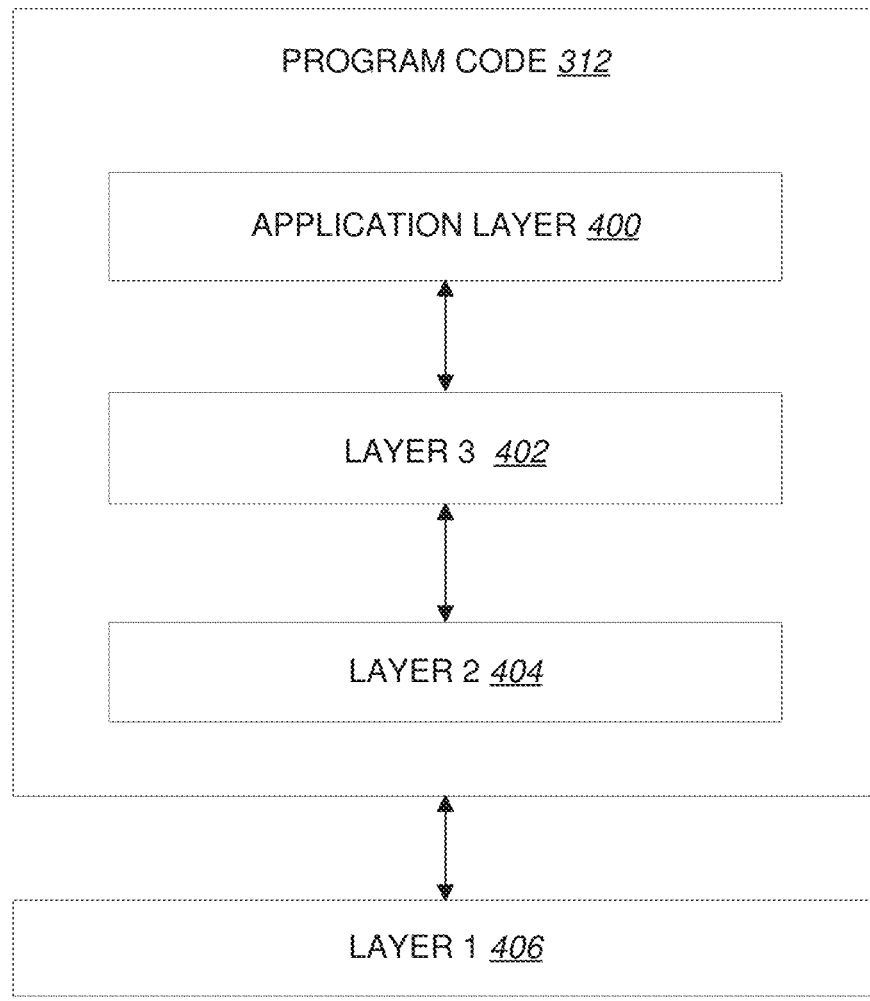
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

A study item for improvement on multi-Universal Subscriber Identity Module (USIM) devices has been approved. Justification of this study item is stated in SP-190248 as follows:

Many commercially deployed devices support more than one USIM card (typically two). Multi-USIM devices typically address the following two use cases:

1) The user has both a personal and a business subscription and wishes to use them both from the same device. This use case has become popular with the BYOD initiatives in the enterprise world.

2) The user has multiple personal subscriptions and chooses which one to use based on the selected service (e.g. use one individual subscription and one "family circle" plan).

In either of the two use cases the USIMs may be from the same or from different MNOs.

In the past these kind of multi-USIM devices have been particularly popular in emerging economies, but are nowadays spreading even in regions that so far have not witnessed massive demand for multi-USIM devices.

Support for multi-USIM is currently handled in an implementation-specific manner without any support from 3GPP specifications, resulting in a variety of implementations and UE behaviours (e.g. Dual SIM Single Standby, Dual SIM Dual Standby, Dual SIM Dual Active, etc.).

For cost efficiency reasons, a multi-USIM device implementation typically uses common radio and baseband components that are shared among the multiple USIMs, which can lead to several issues that impact the 3GPP system performance. Consider a multi-USIM device that is actively engaged in communication with a 3GPP system:

While actively communicating with the first system, the UE needs to occasionally check the other system (e.g. to read the paging channel, perform measurements, or read the system information). This occasional activity on the second system may or may not have any performance impact, depending on the UE implementation.

NOTE 1: The specific aspects of how the UE manages to read information in the second system while actively communicating with the first system are not to be considered in SA2, but could be considered in RAN working groups.

Paging Occasions (POs) are calculated based on the UE identifier (IMSI and 5G-S-TMSI for EPS and 5GS, respectively). In some cases the UE identifier values associated with the different USIMs can lead to systematic collisions which may result in missed pages.

When the UE receives a page on the second system, the UE needs to be able to decide whether it should respond to the page (e.g. by following user-configured rules). In the absence of information indicating the service type that triggered the paging, the UE would have to blindly decide whether to ignore the page or respond to it.

NOTE 2: It is noted that UTRA-Uu supports a Paging Cause which indicates the traffic type that triggered the page.

When the UE decides to respond to the page in the second system, or when the UE needs to perform some signalling activity in the second system (e.g. Periodic Mobility Registration Update), the UE may need to stop the current activity in the first system. In the absence of any procedure for suspension of the ongoing activity, the UE has to autonomously release the RRC connection with the first system and abruptly leave. This is likely to be interpreted as an error case by the first system and has the potential to distort the statistics in the first system, and misguide the algorithms that rely on them. Moreover, during the UE's absence, the first system will keep paging the UE which will result in waste of paging resources.

Objectives of the study item for multi-USIM devices are stated in SP-190248 as follows:

This study item shall address the following system enablers for multi-USIM devices:

A mechanism for delivering paging destined to USIM A while the UE is actively communicating with USIM B.

A mechanism allowing for suspension (or release) and resumption of an ongoing connection in the 3GPP system associated with USIM A, so that the UE can temporarily leave to the 3GPP system associated with USIM B, and then return to the 3GPP system in a network-controlled manner. The study shall determine how the network handles MT data or MT control-plane activity occurrence on a suspended connection.

A mechanism for avoidance of paging collisions occurring in the UE between USIM A and USIM B.

Handling of emergency calls and sessions.

Handling of service prioritization i.e. the study shall determine whether the UE behaviour upon reception of paging information is driven by USIM configuration or user preferences or both.

NOTE 1: This objective is expected to be further aligned through Stage 1 requirements. Additional objectives may be added if there are further Stage 1 requirements.

NOTE 2: The enablers for Dual-USIM are expected to also apply to multi-USIM scenarios. The study shall be restricted to single Rx/single Tx and dual Rx/single Tx UE implementations.

NOTE 3: The focus of the study is on enablers for multi-USIM implementations relying on common radio and baseband components that are shared among the multiple USIMs.

The problem statement being common to 5GS and EPS, it is expected that the study conclusions will apply to both 5GS and EPS, but the solutions for 5GS and EPS need not be the same.

The system enablers for multi-USIM devices are expected to apply for the cases where the multiple USIMs are owned by the same or by different MNOs.

Paging monitoring in NR is described in 3GPP TS 38.304 V15.3.0 as follows:

7.1 Discontinuous Reception for Paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO.

In multi-beam operations, the UE assumes that the same paging message is repeated in all transmitted beams and thus the selection of the beam(s) for the reception of the paging message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

(SFN+PF_offset)mod $T=(T$ div $N)*(UE\_ID$ mod $N)$

Index (Ls), indicating the index of the PO is determined by:

$i\_s=$floor(UE_ID/$N$)mod $Ns$

The PDCCH monitoring occasions for paging are determined according to pagingSearchSpace as specified in TS 38.213 [4] and firstPDCCH-MonitoringOccasion-OfPO if configured as specified in TS 38.331 [3]. When SearchSpaceId=0 is configured for pagingSearchSpace, the PDCCH monitoring occasions for paging are same as for RMSI as defined in clause 13 in TS 38.213 [4]. When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S' consecutive PDCCH monitoring occasions where 'S' is the number of actual transmitted SSBs determined according to ssb-PositionsInBurst in SIB1 The $K^{th}$ PDCCH monitoring occasion for paging in the PO corresponds to the $K^{th}$ transmitted SSB. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value, if configured by RRC or upper layers, and a default DRX value broadcast in system information. If UE specific DRX is not configured by RRC or by upper layers, the default value is applied).

N: number of total paging frames in T

Ns: number of paging occasions for a PF

PF_offset: offset used for PF determination

UE ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331 [3]. The parameter first-PDCCH-MonitoringOccasion-OfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE ID=0 in the PF and i_s formulas above.

5G-S-TMSI is a 48 bit long bit string as defined in TS 23.501 [10]. 5G-S-TMSI shall in the formulae above be interpreted as a binary number where the left most bit represents the most significant bit.

Figure 5:
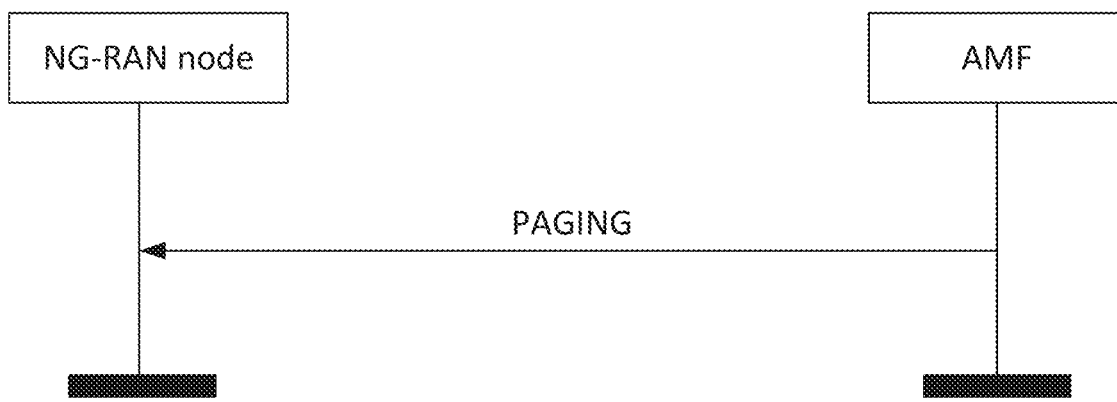
FIG. 5 is a diagram illustrating an exemplary scenario associated with paging.

Paging procedure from 5G Core Network (CN) to Next-Generation Random Access Network (NG RAN) is specified in 3GPP TS 38.413 V15.3.0. Notably, FIG. 8.5.1.2-1 of Section 8.5.1.2 of 3GPP TS 38.413 V15.3.0, entitled "Paging", is reproduced herein as FIG. 5. Parts of 3GPP TS 38.413 V15.3.0 are quoted below:

8.5 Paging Procedures 8.5.1 Paging 8.5.1.1 General

The purpose of the Paging procedure is to enable the AMF to page a UE in the specific NG-RAN node.

8.5.1.2 Successful Operation

Figure 8:
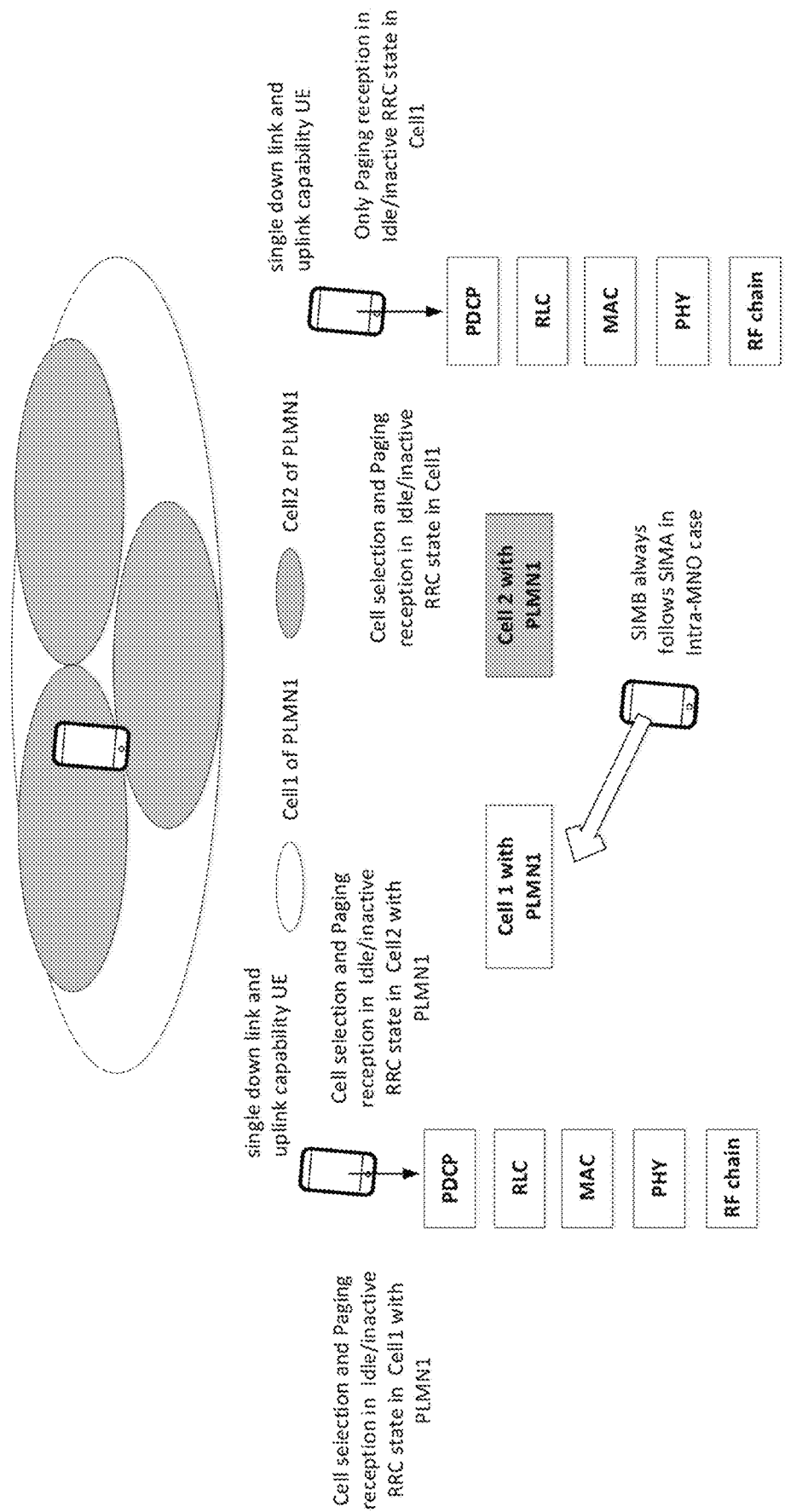
FIG. 8 is a diagram illustrating an exemplary scenario associated with cell selection enhancement.

FIG. 8.5.1.2-1: Paging

The AMF initiates the Paging procedure by sending the PAGING message to the NG-RAN node.

At the reception of the PAGING message, the NG-RAN node shall perform paging of the UE in cells which belong to tracking areas as indicated in the TAI List for Paging IE.

If the Paging DRX IE is included in the PAGING message, the NG-RAN node shall use it according to TS 38.304 [12] and TS 36.304 [29].
For each cell that belongs to any of the tracking areas indicated in the TAI List for Paging IE, the NG-RAN node shall generate one page on the radio interface.
If the Paging Priority IE is included in the PAGING message, the NG-RAN node may use it according to TS 23.501 [9].
If the UE Radio Capability for Paging IE is included in the PAGING message, the NG-RAN node may use it to apply specific paging schemes.
If the Assistance Data for Recommended Cells IE is included in the Assistance Data for Paging IE it may be used, together with the Paging Attempt Information IE if also present, according to TS 38.300 [8].
If the Next Paging Area Scope IE is included in the Paging Attempt Information IE it may be used for paging the UE according to TS 38.300 [8].
If the Paging Origin IE is included in the PAGING message, the NG-RAN node shall transfer it to the UE according to TS 38.331 [18] and TS 36.331 [21].
In addition, the paging message for the paging procedure from 5G CN to NG RAN is also specified in TS 38.413 [3]:
9.2.4 Paging Messages
9.2.4.1 PAGING
This message is sent by the AMF and is used to page a UE in one or several tracking areas.
Direction: AMF→gNB specified in TS 38.304 [20]. The network may address multiple UEs within a Paging message by including one PagingRecord for each UE.
5.3.2.3 Reception of the Paging Message by the UE
Upon receiving the Paging message, the UE shall:
1> if in RRC_IDLE, for each of the PagingRecord, if any, included in the Paging message:
   2> if the ue-Identity included in the PagingRecord matches the UE identity allocated by upper layers:
      3> forward the ue-Identity and accessType (if present) to the upper layers;
1> if in RRC_INACTIVE, for each of the PagingRecord, if any, included in the Paging message:
   2> if the ue-Identity included in the PagingRecord matches the UE's stored fullI-RNTI:
      3> if the UE is configured by upper layers with Access Identity 1:
         4> initiate the RRC connection resumption procedure according to 5.3.13 with resume Cause set to mps-PriorityAccess;
      3> else if the UE is configured by upper layers with Access Identity 2:
         4> initiate the RRC connection resumption procedure according to 5.3.13 with resume Cause set to mcs-PriorityAccess;
      3> else if the UE is configured by upper layers with one or more Access Identities equal to 11-15:
         4> initiate the RRC connection resumption procedure according to 5.3.13 with resume Cause set to highPriorityAccess;

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| UE Paging Identity | M | | 9.3.3.18 | | YES | ignore |
| Paging DRX | O | | 9.3.1.90 | | YES | ignore |
| TAI List for Paging | | 1 | | | YES | ignore |
| >TAI List for Paging Item | | 1 ...<maxnoofTAIforPaging> | | | — | |
| >>TAI | M | | 9.3.3.11 | | — | |
| Paging Priority | O | | 9.3.1.78 | | YES | ignore |
| UE Radio Capability for Paging | O | | 9.3.1.68 | | YES | ignore |
| Paging Origin | O | | 9.3.3.22 | | YES | ignore |
| Assistance Data for Paging | O | | 9.3.1.69 | | YES | ignore |

| Range bound | Explanation |
|---|---|
| maxnoofTAIforPaging | Maximum no. of TAIs for paging. Value is 16. |

Figure 6:
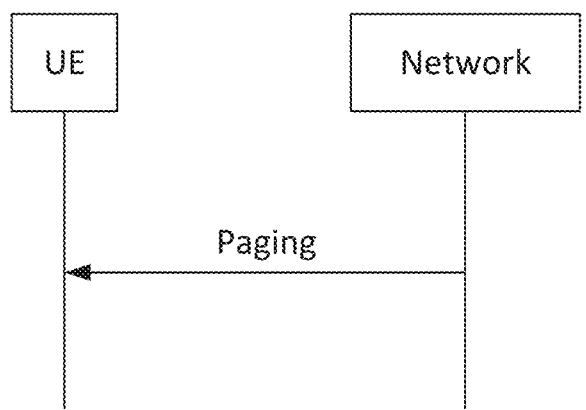
FIG. 6 is a diagram illustrating an exemplary scenario associated with paging.

Paging procedure from 5G NR to UE is specified in 3GPP TS 38.331 V15.5.1. Notably, FIG. 5.3.2.1-1 of Section 5.3.2.1 of 3GPP TS 38.331 V15.5.1, entitled "Paging", is reproduced herein as FIG. 6. Parts of 3GPP TS 38.331 V15.5.1 are quoted below:
5.3.2 Paging
5.3.2.1 General FIG. 5.3.2.1-1: Paging The purpose of this procedure is:
  to transmit paging information to a UE in RRC_IDLE or RRC_INACTIVE.
5.3.2.2 Initiation
  The network initiates the paging procedure by transmitting the Paging message at the UE's paging occasion as 3> else:
         4> initiate the RRC connection resumption procedure according to 5.3.13 with resume Cause set to mt-Access;
   2> else if the ue-Identity included in the PagingRecord matches the UE identity allocated by upper layers:
      3> forward the ue-Identity to upper layers and accessType (if present) to the upper layers;
      3> perform the actions upon going to RRC_IDLE as specified in 5.3.11 with release cause 'other'.
A paging message from 5G NR to UE is specified in 3GPP TS 38.331 V15.5.1 as follows:
Paging
   The Paging message is used for the notification of one or more UEs.

Signalling radio bearer: N/A
RLC-SAP: TM
Logical channel: PCCH
Direction: Network to UE
Paging message

```
-- ASN1START
-- TAG-PAGING-START
Paging ::=                      SEQUENCE {
    pagingRecordList                PagingRecordList
OPTIONAL, -- Need N
    lateNonCriticalExtension        OCTET STRING
OPTIONAL,
    nonCriticalExtension            SEQUENCE{ }
OPTIONAL
}
PagingRecordList ::=            SEQUENCE (SIZE(1. .maxNrofPageRec)) OF PagingRecord
PagingRecord ::=                SEQUENCE {
    ue-Identity                     PagingUE-Identity,
    accessType                      ENUMERATED {non3GPP} OPTIONAL,   -- Need N
    ...
}
PagingUE-Identity ::=           CHOICE {
    ng-5G-S-TMSI                    NG-5G-S-TMSI,
    fullI-RNTI                      I-RNTI-Value,
    ...
}
-- TAG-PAGING-STOP
-- ASN1STOP
```

Figure 7:
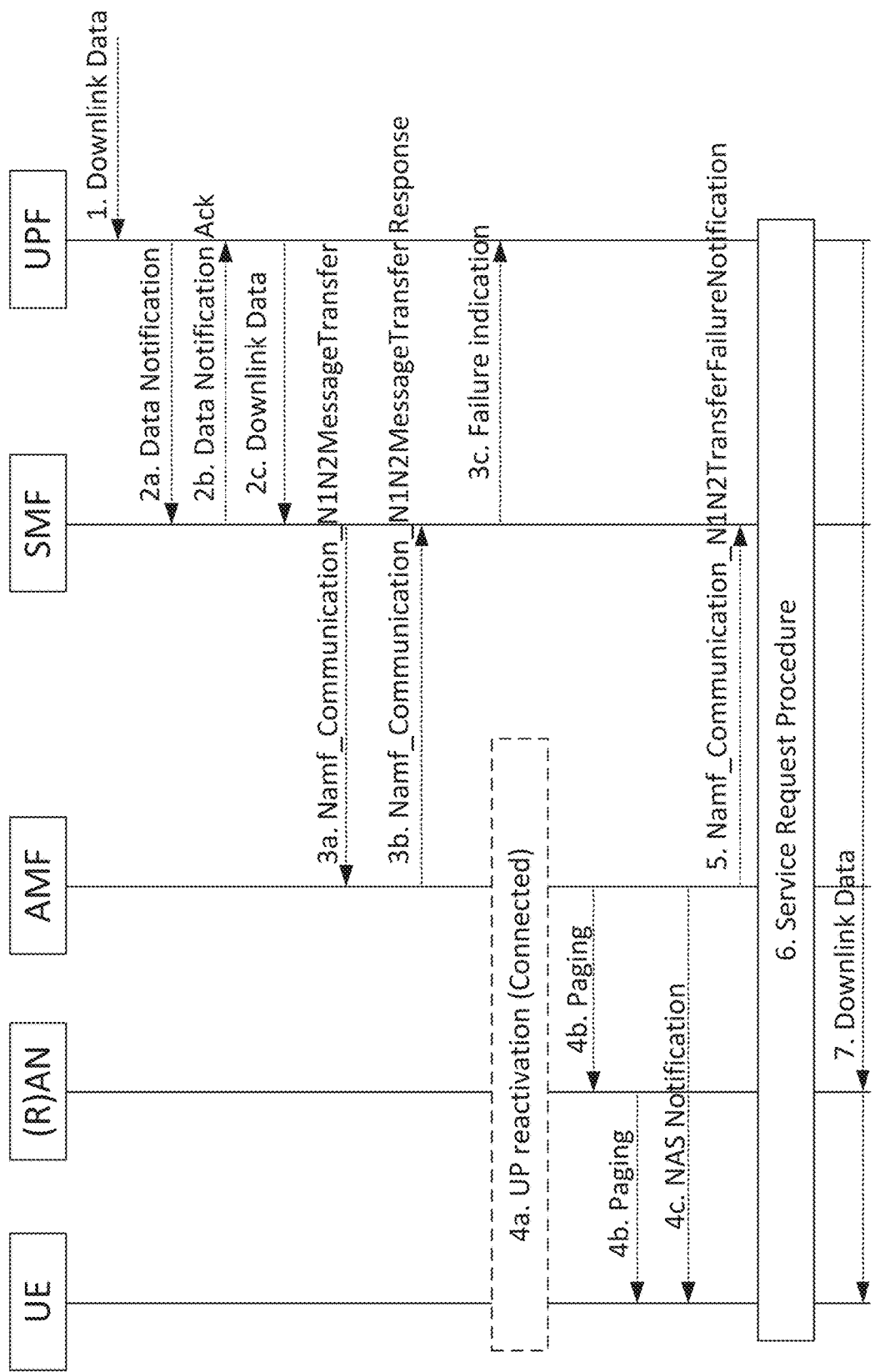
FIG. 7 is a diagram illustrating an exemplary scenario associated with a network triggered service request.

A network triggered service request is specified in 3GPP TS 23.502 V16.0.2. Notably, FIG. 4.2.3.3-1 of Section 4.2.3.3 of 3GPP TS 23.502 V16.0.2, entitled "Network Triggered Service Request", is reproduced herein as FIG. 7. Parts of 3GPP TS 23.502 V16.0.2 are quoted below:

4.2.3.3 Network Triggered Service Request

FIG. 4.2.3.3-1: Network Triggered Service Request

4a. [Conditional] If the UE is in CM-CONNECTED state in the access associated with the PDU Session ID received from the SMF in step 3a, the steps 12 to 22 in UE Triggered Service Request procedure (see clause 4.2.3.2) are performed for this PDU Session (i.e. establish the radio resources and, in the case that the User Plane is to be activated, to establish the N3 tunnel) without sending a
  Paging message to the (R)AN node and the UE. In step 12 of clause 4.2.3.2, the AMF does not send the NAS Service Accept message to the UE. The rest of this procedure is omitted.
4b. [Conditional] If the UE is in CM-IDLE state in 3GPP access and the PDU Session ID received from the SMF in step 3a has been associated with 3GPP access and based on local policy the AMF decides to notify the UE through 3GPP access even when UE is in CM-CONNECTED state for non-3GPP access, the AMF may send a Paging message to NG-RAN node(s) via 3GPP access.
  If the UE is simultaneously registered over 3GPP and non-3GPP accesses in the same PLMN, the UE is in CM-IDLE state in both 3GPP access and non-3GPP access, and the PDU Session ID in step 3a is associated with non-3GPP access, the AMF sends a Paging message with associated access "non-3GPP" to NG-RAN node(s) via 3GPP access.
  If the UE is in RM-REGISTERED state and CM-IDLE and reachable in 3GPP access, the AMF sends a Paging message (NAS ID for paging, Registration Area list, Paging DRX length, Paging Priority, access associated to the PDU Session, Enhanced Coverage Restricted information) to (R)AN node(s) belonging to the Registration Area(s) in which the UE is registered, then the NG-RAN node pages the UE, including the access associated to the PDU Session in the paging message if received from the AMF, see TS 38.331 [12]. If extended idle mode DRX was accepted by the AMF in the last registration procedure, the AMF includes extended idle mode DRX cycle length and Paging Time Window in the Paging message.
NOTE 2: The usage of the Access associated with a PDU Session when paging an UE is defined in TS 23.501 [2] clause 5.6.8.
  Different paging strategies may be configured in the AMF for different combinations of DNN, Paging Policy Indicator (if supported), ARP and 5QI.
  For RRC-inactive state, the paging strategies may be configured in the (R)AN for different combinations of Paging Policy Indicator, ARP and 5QI.
  Paging Priority is included only:
    if the AMF receives an Namf Communication_N1N2MessageTransfer message with an ARP value associated with priority services (e.g., MPS, MCS), as configured by the operator.
    One Paging Priority level can be used for multiple ARP values. The mapping of ARP values to Paging Priority level (or levels) is configured by operator policy in the AMF and in NG-RAN. The (R)AN may prioritize the paging of UEs according to the Paging Priority.
  If the AMF, while waiting for a UE response to the Paging Request message sent without Paging Priority, receives an Namf Communication_N1N2MessageTransfer message, which indicates an ARP value associated with priority services (e.g., MPS, MCS), as configured by the operator, the AMF shall send another paging message with the suitable Paging Priority. For subsequent received Namf Communication_N1N2MessageTransfer messages with the same or higher priority, the AMF may determine whether to send the Paging message with suitable Paging Priority based on local policy.

Paging strategies may include:
  paging retransmission scheme (e.g. how frequently the paging is repeated or with what time interval);
  determining whether to send the Paging message to the (R)AN nodes during certain AMF high load conditions;
  whether to apply sub-area based paging (e.g. first page in the last known cell-id or TA and retransmission in all registered TAs).

NOTE 3: Setting of Paging Priority in the Paging message is independent from any paging strategy.

The AMF and the (R)AN may support further paging optimizations in order to reduce the signalling load and the network resources used to successfully page a UE by one or several of the following means:
  by the AMF implementing specific paging strategies (e.g. the N2 Paging message is sent to the (R)AN nodes that served the UE last);
  by the AMF considering Information On Recommended Cells And NG-RAN nodes provided by the (R)AN at transition to CM-IDLE state. The AMF takes the (R)AN nodes related part of this information into account to determine the (R)AN nodes to be paged, and provides the information on recommended cells within the N2 Paging message to each of these (R)AN nodes;
  by the (R)AN considering the Paging Attempt Count Information provided by the AMF at paging.

If the UE Radio Capability for Paging Information is available in the AMF, the AMF adds the UE Radio Capability for Paging Information in the N2 Paging message to the (R)AN nodes.

If the Information On Recommended Cells And (R)AN nodes For Paging is available in the AMF, the AMF shall take that information into account to determine the (R)AN nodes for paging and, when paging a (R)AN node, the AMF may transparently convey the information on recommended cells to the (R)AN node.

The AMF may include in the N2 Paging message(s) the paging attempt count information. The paging attempt count information shall be the same for all (R)AN nodes selected by the AMF for paging.

If the AMF has Paging Assistance Data for CE capable UE stored in the UE Context in AMF, and Enhanced Coverage is not restricted for the UE then the AMF shall include Paging Assistance Data for CE capable UE in the N2 paging message for all NG-RAN nodes selected by the AMF for paging.

4c. [Conditional] If the UE is simultaneously registered over 3GPP and non-3GPP accesses in the same PLMN, and the UE is in CM-CONNECTED state in 3GPP access and the PDU Session ID in step 3a is associated with non-3GPP access, the AMF sends a NAS Notification message containing the non-3GPP Access Type to the UE over 3GPP access and sets a Notification timer. Step 5 is omitted.

If the UE is simultaneously registered over 3GPP and non-3GPP accesses in the same PLMN, and the UE is in CM-CONNECTED state for non-3GPP access and in CM-IDLE for 3GPP access, and if the PDU Session ID in step 3a is associated with 3GPP access, and based on local policy the AMF decides to notify the UE through non-3GPP access, the AMF may send a NAS Notification message containing the 3GPP Access Type to the UE over non-3GPP access and sets a Notification timer.

Bandwidth Part (BWP) in NR is described in 3GPP TS 38.300, V15.0.0 as follows:

6.10 Bandwidth Adaptation

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

7.8 Bandwidth Adaptation

To enable BA on the PCell, the gNB configures the UE with UL and DL BWP(s). To enable BA on SCells in case of CA, the gNB configures the UE with DL BWP(s) at least (i.e. there may be none in the UL). For the PCell, the initial BWP is the BWP used for initial access. For the SCell(s), the initial BWP is the BWP configured for the UE to first operate at SCell activation.

In paired spectrum, DL and UL can switch BWP independently. In unpaired spectrum, DL and UL switch BWP simultaneously. Switching between configured BWPs happens by means of RRC signalling, DCI, inactivity timer or upon initiation of random access. When an inactivity timer is configured for a serving cell, the expiry of the inactivity timer associated to that cell switches the active BWP to a default BWP configured by the network. There can be at most one active BWP per cell, except when the serving cell is configured with SUL, in which case there can be at most one on each UL carrier.

In RP-191304 and RP-190833, cell selection and reselection enhancement for one operator is discussed. Notably, FIG. 6 of RP-191304, entitled "cell selection enhancement", is reproduced herein as FIG. 8. According to RP-191304, performance of cell selection and/or reselection for different USIMs independently of one another may waste UE power and/or may prolong and/or extend the time it takes for a multi-USIM device using common radio and/or baseband components to perform the cell selection and/or reselection. If two different USIM cards belong to the same operator, some coordination should be studied (e.g., such coordination may correspond to where cell selection and/or reselection associated with a secondary Subscriber Identity Module (SIM) follows cell selection and/or reselection associated with a primary SIM). According to RP-190833, cell search and/or measurement are performed independently for each SIM, which may cause (unnecessary) delay and/or power consumption when two SIMs belong to a single Mobile Network Operator (MNO). Enhanced procedures for cell selection and/or reselection should be designed and/or studied.

For a UE with multiple USIMs, such as a UE with a first USIM and a second USIM, each USIM may be registered with its network independently, even when the multiple USIMs belong to a same operator (and/or a same MNO). It is possible that a Radio Resource Control (RRC) connection corresponding to each USIM of the multiple USIMs is maintained independently (e.g., a first RRC connection corresponding to the first USIM and/or a second RRC connection corresponding to the second USIM may be maintained independently). It is possible that a RRC connection corresponding to one USIM is established while a RRC connection corresponding to another USIM is released (and/or is inactive). For example, a first RRC state, of the UE, corresponding to the first USIM is connected state (e.g., RRC_CONNECTED state) while a second RRC state, of the UE, corresponding to the second USIM is idle state (e.g., RRC_IDLE state) and/or inactive state (e.g., RRC_INACTIVE state).

Based on RP-191304 and RP-190833, a procedure for cell selection and/or reselection may be enhanced for a multi-USIM device comprising multiple USIMs that belong to the same operator (and/or the same MNO) by sharing the same cell search and/or measurement associated with one USIM of the multiple USIMs with one or more other USIMs of the multiple USIMs. However, as illustrated in FIG. 8, paging monitoring and reception for each USIM still needs to be performed independently. The term "paging monitoring", as used herein, may correspond to monitoring, such as performed by a UE, for paging (e.g., one or more paging messages) from a network node. For example, the UE may monitor one or more channels (e.g., Physical Downlink Control Channel (PDCCH) and/or one or more different channels) to check for the presence of one or more paging messages from one or more network nodes associated with one or more USIMs of the UE. One or more paging messages may be received by the UE while the UE performs paging monitoring. The timing to monitor paging (e.g., one or more times at which a UE monitors for paging messages) for a USIM is derived using a UE Identifier (UE ID/UE ID) (e.g., a Temporary Mobile Subscriber Identity (TMSI), such as a Serving-TMSI (S-TMSI) and/or a 5G-S-TMSI) associated with the USIM (e.g., the timing may correspond to one or more paging frames and/or one or more paging occasions, such as discussed in 3GPP TS 38.304 V15.3.0). In such a scenario, a multi-USIM UE monitors paging for each USIM independently which may waste UE power of the multi-USIM UE (e.g., the multi-USIM UE may monitor paging for each USIM independently due to different UE IDs, such as different 5G-S-TMSIs, for different USIMs of the multi-USIM UE).

Moreover, depending on a capability of the multi-USIM UE, if the multi-USIM UE cannot monitor paging for a first USIM and perform reception (e.g., data reception) for a second USIM at the same time (due to the multi-USIM UE comprising a single receiver, for example), the multi-USIM UE performing paging monitoring for the first USIM may cause a service interruption for the first USIM. One or more of the techniques presented herein, such as one or more techniques described below with respect to Embodiment 1 and/or one or more other techniques described herein, may be implemented to solve one or more of the discussed issues associated with multi-USIM UE operation, such as one or more of the service interruption, inefficient power consumption of the UE, etc.

Embodiment 1

In Embodiment 1 of the present disclosure, for a UE (e.g., a multi-USIM UE) with multiple USIMs comprising a first USIM and a second USIM, the UE may stop monitoring (and/or does not monitor) paging (in a serving cell for the second USIM) based on one or more paging frames and/or one or more paging occasions derived using a UE ID associated with the second USIM when a RRC state, of the UE, corresponding to the first USIM is (and/or enters) connected state. Alternatively and/or additionally, in Embodiment 1, a network may not page the second USIM (in the serving cell for the second USIM) via the one or more paging frames and/or the one or more paging occasions derived using the UE ID associated with the second USIM (when the RRC state corresponding to the first USIM is connected state). In some embodiments, the network may page the second USIM (and/or provide an indication to page the second USIM) via an established connection (e.g., an established RRC connection) associated with the first USIM (e.g., the network may page the second USIM and/or provide the indication to page the second USIM in a serving cell for the first USIM). Alternatively and/or additionally, the network may page the second USIM (and/or provide an indication to page the second USIM) via one or more paging frames and/or one or more paging occasions derived using a UE ID associated with the first USIM (e.g., the network may page the second USIM and/or provide the indication to page the second USIM in a serving cell for the first USIM).

Figure 9:
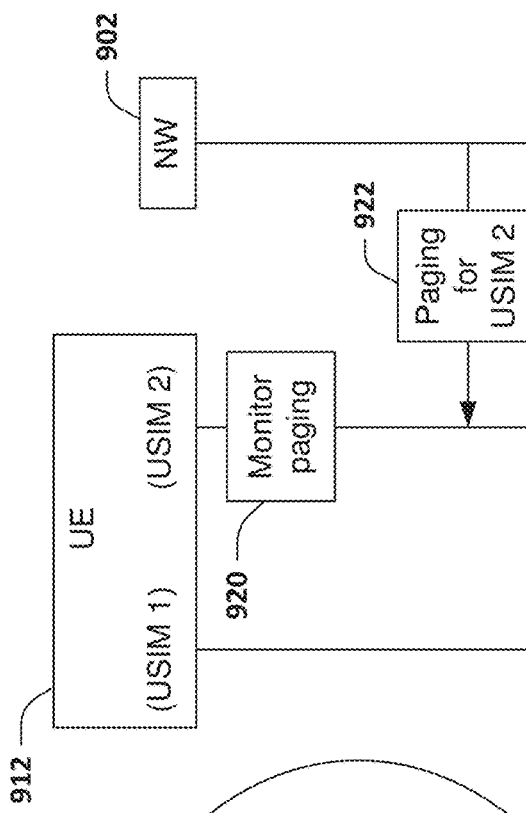
FIG. 9 is a diagram illustrating an exemplary scenario associated with a multi-Universal Subscriber Identity Module (USIM) device, according to one exemplary embodiment.
Figure 9:
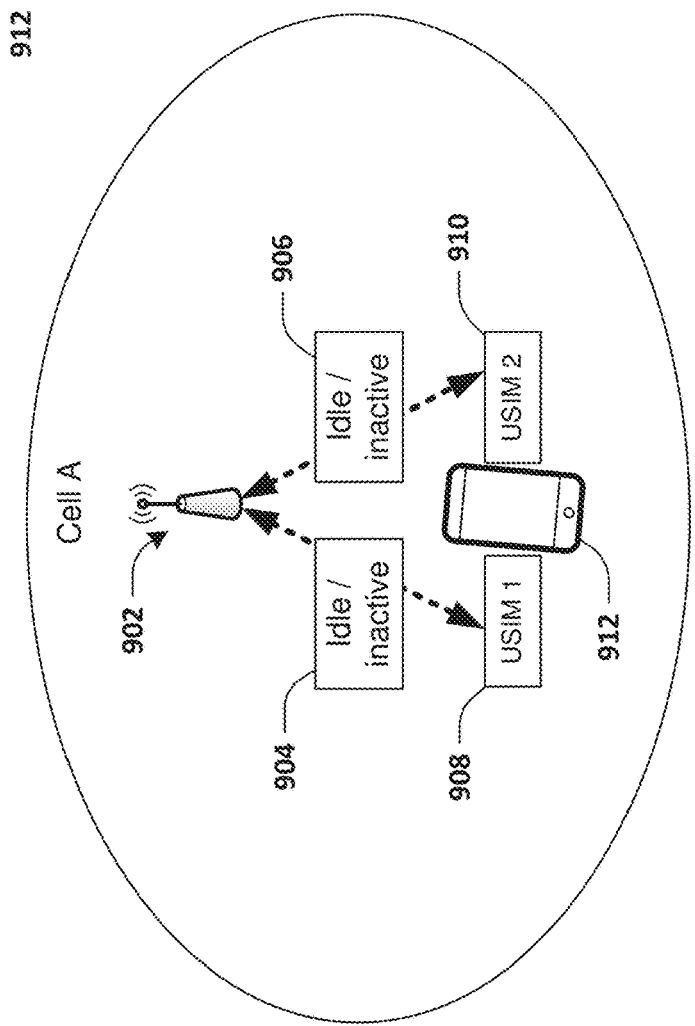
Figure 10:
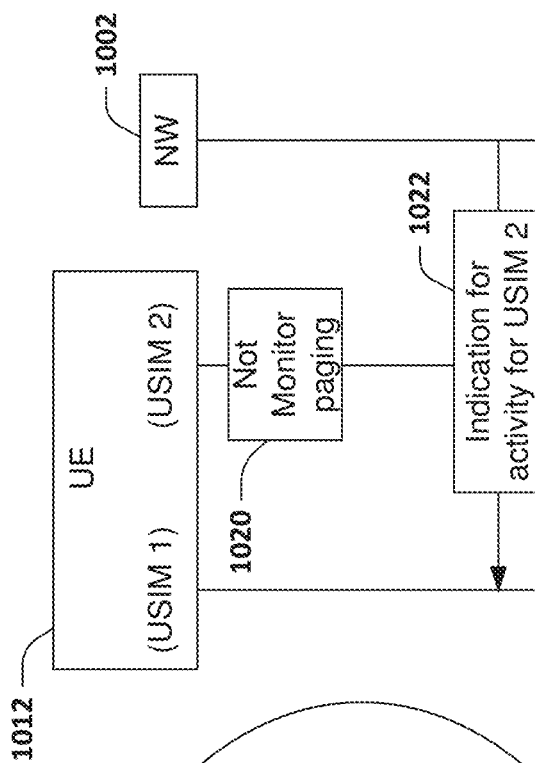
FIG. 10 is a diagram illustrating an exemplary scenario associated with a multi-USIM device, according to one exemplary embodiment.
Figure 10:
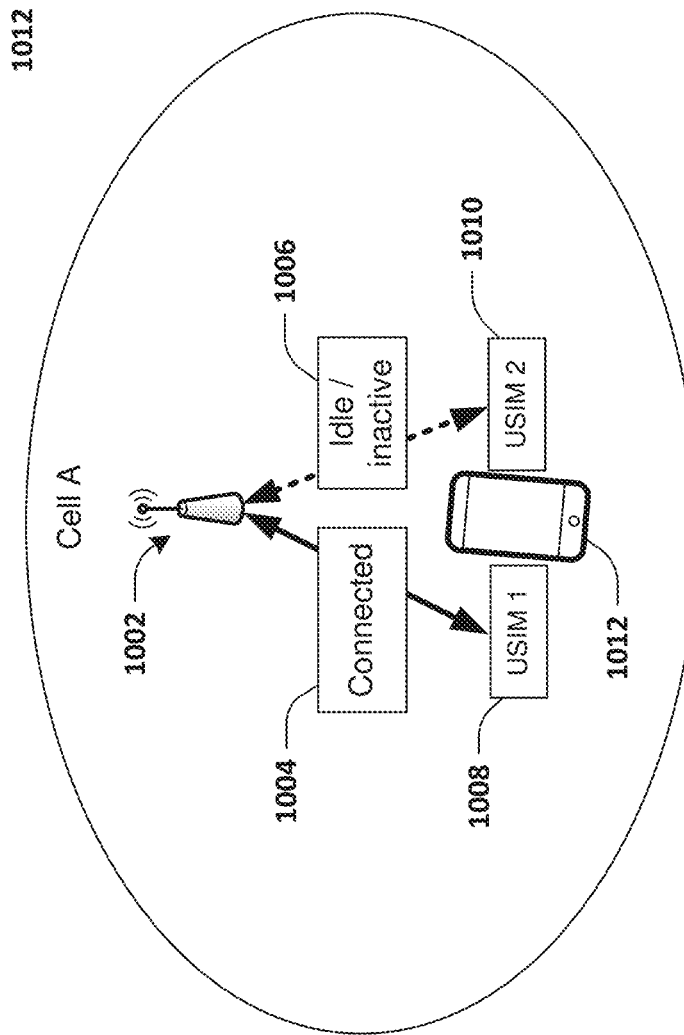

FIGS. 9-10 illustrate exemplary scenarios in accordance with one or more embodiments provided herein with respect to Embodiment 1. In FIG. 9, a UE 912 (e.g., a multi-USIM UE) comprising a first USIM 908 ("USIM 1") and a second USIM 910 ("USIM 2") is provided. In some embodiments, a state 904 (e.g., a RRC state), of the UE 912, corresponding to the first USIM 908 is idle state and/or inactive state and/or a state 906 (e.g., a RRC state), of the UE 912, corresponding to the second USIM 910 is idle state and/or inactive state. For example, a connection (e.g., a RRC connection), associated with the first USIM 908, of the UE 912 with a network 902 may not be established and/or a connection (e.g., a RRC connection), associated with the second USIM 910, of the UE 912 with the network 902 may not be established. In some embodiments, the UE 912 monitors paging 920 for the second USIM 910 (e.g., the UE 912 monitors for paging messages associated with the second USIM 910) on one or more paging frames and/or one or more paging occasions derived using a UE ID associated with the second USIM 910. In some embodiments, the network 902 may page 922 for the second USIM 910 via one or more paging frames and/or one or more paging occasions derived using the UE ID associated with the second USIM 910.

In FIG. 10, a UE 1012 (e.g., a multi-USIM UE) comprising a first USIM 1008 ("USIM 1") and a second USIM 1010 ("USIM 2") is provided. In some embodiments, a state 1004 (e.g., a RRC state), of the UE 1012, corresponding to the first USIM 1008 is connected state and/or a state 1006 (e.g., a RRC state), of the UE 1012, corresponding to the second USIM 1010 is idle state and/or inactive state. For example, a connection (e.g., a RRC connection), associated with the first USIM 1008, of the UE 1012 with a network 1002 may be established and/or a connection (e.g., a RRC connection), associated with the second USIM 1010, of the UE 1012 with the network 1002 may not be established. In some embodiments, the UE 1012 does not monitor paging 1020 for the second USIM 1010 on one or more paging frames and/or one or more paging occasions derived using a UE ID associated with the second USIM 1010. In some embodiments, the network 1002 may page for the second USIM 1010 via the established connection associated with the first USIM 1008. In an example, the network 1002 may page for the second USIM 1010 by transmitting 1022, via the established connection associated with the first USIM 1008, an indication for activity for the second USIM 1010.

Alternatively and/or additionally, in Embodiment 1, for a UE with multiple USIMs comprising a first USIM and a second USIM, a downlink (DL) Bandwidth Part (BWP) on which the UE monitors paging for the second USIM may be based on a first state (e.g., a RRC state), of the UE, corresponding to the first USIM (e.g., the DL BWP on which the UE monitors for paging messages may be based on the first state of the UE). If the first state corresponding to the first USIM is connected state (e.g., RRC_CONNECTED state) and a second state (e.g., a RRC state), of the UE, corresponding to the second USIM is idle state (e.g., RRC_IDLE state) and/or inactive state (e.g., RRC_INACTIVE state), the UE may monitor paging for the second USIM (such as based on one or more paging frames and/or one or more paging occasions derived using a UE ID associated with the second USIM) on a current active DL BWP (in a serving cell) corresponding to the first USIM. For example, a network may page the second USIM by transmitting a paging message for the second USIM on the current active DL BWP corresponding to the first USIM. The current active DL BWP may not be a default DL BWP (in the serving cell). The current active DL BWP may not be an initial DL BWP (in the serving cell). If the first state corresponding to the first USIM is idle state (e.g., RRC_IDLE state) and/or inactive state (e.g., RRC_INACTIVE state) and the second state corresponding to the second USIM is idle state (e.g., RRC_IDLE state) and/or inactive state (e.g., RRC_INACTIVE state), the UE may monitor paging for the second USIM (such as based on one or more paging frames and/or one or more paging occasions derived using the UE ID associated with the second USIM) on the initial DL BWP (corresponding to the second USIM). In this way, interruption of transmission and/or reception caused by BWP switching may be prevented.

In some embodiments, a serving cell for the first USIM and a serving cell for the second USIM may be the same. Alternatively and/or additionally, the serving cell for the first USIM and the serving cell for the second USIM may be different. In some embodiments, a Radio Access Technology (RAT) of the serving cell for the first USIM may be different than a RAT of the serving cell for the second USIM (e.g., one of the RATs may correspond to NR and another one of the RATs may correspond to Evolved Universal Terrestrial Radio Access Network (E-UTRAN) and/or LTE).

One or more first actions described herein associated with at least one of paging monitoring performed by the UE, transmitting a paging message by the network, etc. may be more suitable and/or useful in some circumstances than in other circumstances. The one or more first actions may comprise one or more actions described herein with respect to Embodiment 1, such as one or more actions described with respect to FIG. 9 and/or FIG. 10, one or more actions associated with the UE stopping monitoring paging (in a serving cell for the second USIM) based on one or more paging frames and/or one or more paging occasions derived using a UE ID associated with the second USIM when a UE state corresponding to the first USIM is (and/or enters) connected state, one or more actions associated with using the current active DL BWP and/or the initial DL BWP for monitoring paging, and/or one or more other actions described herein with respect to Embodiment 1, such as in the foregoing description and/or the following description. In an example where the one or more first actions are not performed and/or applied by the UE and/or the network, the UE may monitor paging for the second USIM based on one or more paging frames and/or one or more paging occasions derived using the UE ID associated with the second USIM, even when the first state, of the UE, corresponding to the first USIM is connected state. In the example where the one or more first actions are not performed and/or applied by the UE and/or the network, the UE may monitor paging for the second USIM on the initial DL BWP of the serving cell for the second USIM.

The UE (and/or the network) may determine whether to perform and/or apply the one or more first actions based on whether one or more conditions are met (e.g., the one or more conditions are fulfilled). For example, the UE (and/or the network) may start performing and/or applying the one or more first actions if (and/or when) the one or more conditions are met (e.g., the UE performs and/or applies the one or more first actions responsive to a determination that the one or more conditions are met). Alternatively and/or additionally, the UE (and/or the network) may stop performing and/or applying the one or more first actions if (and/or when) the one or more conditions are not met (e.g., the UE stops performing and/or applying the one or more first actions responsive to a determination that the one or more conditions are not met).

In some embodiments, the one or more conditions may comprise a first condition that a serving cell for the first USIM and a serving cell for the second USIM are the same serving cell. Alternatively and/or additionally, the one or more conditions may comprise a second condition that a RAT of the serving cell for the first USIM and a RAT of the serving cell for the second USIM are the same RAT. Alternatively and/or additionally, the one or more conditions may comprise a third condition that a tracking area for the first USIM and a tracking area for the second USIM are the same tracking area. Alternatively and/or additionally, the one or more conditions may comprise a fourth condition that a radio access network (RAN) notification area for the first USIM and a RAN notification area for the second USIM are the same RAN notification area. Alternatively and/or additionally, the one or more conditions may comprise a fifth condition that an operator (and/or a MNO) for the first USIM and an operator (and/or a MNO) for the second USIM are the same operator (and/or the same MNO). Alternatively and/or additionally, the one or more conditions may comprise a sixth condition that a state (e.g., a RRC state), of the UE, corresponding to the first USIM is connected state (e.g., RRC_CONNECTED state). Alternatively and/or additionally, the one or more conditions may comprise a seventh condition that a state (e.g., a RRC state), of the UE, corresponding to the second USIM is idle state (e.g., RRC_IDLE state) and/or inactive state (e.g., RRC_INACTIVE state). In some embodiments, the one or more conditions may comprise the first condition, the second condition, the third condition, the fourth condition, the fifth condition, the sixth condition and the seventh condition. Alternatively and/or additionally, the one or more conditions may comprise at least one of the first condition, the second condition, the third condition, the fourth condition, the fifth condition, the sixth condition or the seventh condition. In some embodiments, the UE (and/or the network) may start performing and/or applying the one or more first actions if (and/or when) every condition of the one or more conditions are met (e.g., the UE performs and/or applies the one or more first actions responsive to a determination that every condition of the one or more conditions are met). Alternatively and/or additionally, the UE (and/or the network) may start performing and/or applying the one or more first actions if (and/or when) at least one condition of the one or more conditions are met. In some embodiments, the UE (and/or the network) may stop performing and/or applying the one or more first actions if (and/or when) every condition of the one or more conditions are not met. Alternatively and/or additionally, the UE (and/or the network) may stop performing and/or applying the one or more first actions if (and/or when) at least one condition of the one or more conditions is not met.

In some embodiments, for a UE with multiple USIMs comprising a first USIM and a second USIM, when a RRC connection associated with the first USIM is established and activity (e.g., mobile-terminating activity) occurs for the second USIM, the network may release (and/or suspend) the RRC connection corresponding to the first USIM (without receiving a request to release and/or suspend the RRC connection from the UE). In some embodiments, the RRC connection may be released (and/or suspended) if the activity has a priority that is higher than a priority of currently ongoing activity, corresponding to the first USIM, being performed using the RRC connection. The network may instruct (and/or indicate to) the UE to establish a second connection (e.g., a second RRC connection) corresponding to the second USIM. For example, the network may instruct (and/or indicate to) the UE to establish the second connection by transmitting an indication to the UE, where the indication is indicative of the UE establishing the second connection. In some embodiments, the network may instruct (and/or indicate to) the UE to establish the second connection upon and/or responsive to releasing (and/or suspending) the RRC connection corresponding to the first USIM. For example, the indication may be included in a message (e.g., a dedicated message and/or a RRC message, such as at least one of a RRCRelease message discussed in 3GPP TS 38.331 V15.5.1, a RRCConnectionRelease message discussed in 3GPP TS 36.331 V15.5.1, etc.) used to release (and/or suspend) the RRC connection corresponding to the first USIM. The indication may comprise a value indicative of a cause to release (and/or suspend) the RRC connection. In some embodiments, a UE ID associated with the second USIM may be included in the message.

The first USIM and the second USIM may belong to the same operator (and/or the same MNO). A first state, of the UE, corresponding to the first USIM may be connected state (e.g., RRC_CONNECTED state). A second state, of the UE, corresponding to the second USIM may be idle state (e.g., RRC_IDLE state) and/or inactive state (e.g., RRC_INACTIVE state). When the activity (e.g., the mobile-terminating activity) occurs for the second USIM, the network may determine whether to instruct (and/or indicate to) the UE to release (and/or suspend) the RRC connection corresponding to the first USIM and/or to establish the second connection (e.g., the second RRC connection) corresponding to the second USIM. Alternatively and/or additionally, when the activity (e.g., the mobile-terminating activity) occurs for the second USIM, the network may determine whether to transmit an indication to the UE (such as in a message, e.g., a dedicated message, a RRC message and/or a paging message for the second USIM to the UE). The indication may be indicative of the UE releasing and/or suspending the RRC connection corresponding to the first USIM and/or the UE establishing the second connection (e.g., the second RRC connection) corresponding to the second USIM.

In some embodiments, the network may determine (and/or may need to determine) one or more sets of information before the activity (e.g., the mobile-terminating activity) occurs. For example, the one or more sets of information may be determined via UE reporting (e.g., the one or more sets of information may be received from the UE).

In some embodiments, the one or more sets of information may comprise a first set of information that the first USIM and the second USIM are equipped in the UE (e.g., the same UE equips both the first USIM and the second USIM). Alternatively and/or additionally, the one or more sets of information may comprise a second set of information corresponding to an association between a UE ID associated with the first USIM and a UE ID associated with the second USIM. For example, the association could indicate that both the UE ID associated with the first USIM and the UE ID associated with the second USIM correspond to the same UE. Alternatively and/or additionally, the one or more sets of information may comprise a third set of information corresponding to whether the UE can perform receptions associated with the first USIM and receptions associated with the second USIM at the same time (e.g., whether the UE can receive data associated with the first USIM and data associated with the second USIM concurrently and/or simultaneously). Alternatively and/or additionally, the one or more sets of information may comprise a fourth set of information corresponding to the first state, of the UE, corresponding to the first USIM, such as that the first state is connected state (e.g., RRC_CONNECTED state). Alternatively and/or additionally, the one or more sets of information may comprise a fifth set of information corresponding to a priority of a service currently ongoing via the RRC connection corresponding to the first USIM. Alternatively and/or additionally, the one or more sets of information may comprise a sixth set of information corresponding to the second state, of the UE, corresponding to the second USIM, such as that the second state is idle state (e.g., RRC_IDLE state) and/or inactive state (e.g., RRC_INACTIVE state).

In some embodiments, the network may determine whether to instruct (and/or indicate to) the UE to release (and/or suspend) the RRC connection corresponding to the first USIM and/or to establish the second connection (e.g., the second RRC connection) corresponding to the second USIM based on the one or more sets of information. For example, the network may instruct the UE to release (and/or suspend) the RRC connection corresponding to the first USIM and/or to establish the second connection corresponding to the second USIM based on the one or more sets of information. Alternatively and/or additionally, the network may determine whether to transmit the indication to the UE based on the one or more sets of information. For example, the network may transmit the indication to the UE based on the one or more sets of information.

A paging message for a UE (e.g., a paging message for a USIM of a multi-USIM UE) may originate from a Core Network (CN) (e.g., the paging message may be associated with CN paging). For example, the paging message may be transmitted when a first state, of the UE, corresponding to a first USIM of the UE is connected state and/or a second state, of the UE, corresponding to the second USIM is idle state (and/or idle mode). In some embodiments, when a mobile-terminating activity for the UE occurs, a CN node (e.g., an Access and Mobility Management Function (AMF)) may indicate, to a RAN node that controls a serving cell for the first USIM (e.g., a Next Generation RAN (NG-RAN) node and/or a gNB), that a UE ID associated with the second USIM needs to be paged, such as using one or more paging techniques discussed in 3GPP TS 38.413 V15.3.0. If the RAN node knows and/or determines an association between a UE ID associated with the first USIM and the UE ID associated with the second USIM, the RAN node may determine, based on the first state corresponding to the first USIM, whether to instruct (and/or indicate to) the UE to release (and/or suspend) a RRC connection corresponding to the first USIM and/or to establish a second RRC connection corresponding to the second USIM. Alternatively and/or additionally, if the RAN node knows and/or determines the association between the UE ID associated with the first USIM and the UE ID associated with the second USIM, the RAN node may determine, based on the first state corresponding to the first USIM, whether to transmit an indication to the UE (such as in a message, e.g., a dedicated message, a RRC message and/or a paging message for the second USIM to the UE), where the indication may be indicative of the UE releasing and/or suspending the RRC connection corresponding to the first USIM and/or the UE establishing the second RRC connection corresponding to the second USIM. If the RAN node does not know and/or does not determine the association between the UE ID associated with the first USIM and the UE ID associated with the second USIM, the CN node may indicate the association to the RAN node, such as via paging using one or more paging techniques discussed in 3GPP TS 38.413 V15.3.0 (and/or by transmitting a different type of message to the RAN node that indicates the association).

A paging message for a UE (e.g., a paging message for a USIM of a multi-USIM UE) may originate from a RAN (e.g., the paging message may be associated with RAN paging). For example, the paging message may be transmitted when a first state, of the UE, corresponding to a first USIM of the UE is connected state and/or a second state, of the UE, corresponding to the second USIM is inactive state. In an example of RAN paging, when some data for a UE ID associated with the second USIM arrives at CN, a CN node transmits the data for the UE ID associated with the second USIM to a RAN node (e.g., a NG-RAN node and/or a gNB). In the example of RAN paging, after receiving the data, if a serving cell for the first USIM is controlled by the RAN node, the RAN node may determine, based on the first state corresponding to the first USIM, whether to instruct (and/or indicate to) the UE to release (and/or suspend) a RRC connection corresponding to the first USIM and/or to establish a second RRC connection corresponding to the second USIM. Alternatively and/or additionally, if the serving cell for the first USIM is controlled by the RAN node, the RAN node may determine, based on the first state corresponding to the first USIM, whether to transmit an indication to the UE (such as in a message, e.g., a dedicated message, a RRC message and/or a paging message for the second USIM to the UE), where the indication may be indicative of the UE releasing and/or suspending the RRC connection corresponding to the first USIM and/or the UE establishing the second RRC connection corresponding to the second USIM. In the example of RAN paging, if the serving cell for the first USIM is not controlled by the RAN node, the RAN node may indicate, to a different RAN node controlling the serving cell, that the UE ID associated with the second USIM needs to be paged (and/or the RAN node may indicate, to the different RAN node controlling the serving cell, an association between a UE ID associated with the first USIM and the UE ID associated with the second USIM). Responsive to receiving an indication that the UE ID associated with the second USIM needs to be paged (and/or responsive to receiving the association between the UE ID associated with the first USIM and the UE ID associated with the second USIM), the different RAN node may determine, based on the first state corresponding to the first USIM, whether to instruct (and/or indicate to) the UE to release (and/or suspend) the RRC connection corresponding to the first USIM and/or to establish the second RRC connection corresponding to the second USIM. Alternatively and/or additionally, responsive to receiving the indication that the UE ID associated with the second USIM needs to be paged (and/or responsive to receiving the association between the UE ID associated with the first USIM and the UE ID associated with the second USIM), the different RAN node may determine, based on the first state corresponding to the first USIM, whether to transmit an indication to the UE (such as in a message, e.g., a dedicated message, a RRC message and/or a paging message for the second USIM to the UE), where the indication may be indicative of the UE releasing and/or suspending the RRC connection corresponding to the first USIM and/or the UE establishing the second RRC connection corresponding to the second USIM.

In an example, a network may determine that the first USIM and the second USIM are in the UE (e.g., both the first USIM and the second USIM are in the same UE), the first state corresponding to the first USIM is connected state (e.g., RRC_CONNECTED state), the second state corresponding to the second USIM is idle state (e.g., RRC_IDLE state) and/or inactive state (e.g., RRC_INACTIVE state), and/or the mobile-terminating activity associated with the second USIM has higher priority than the currently ongoing activity via the RRC connection corresponding to the first USIM. Responsive to (and/or based on) the determination that the first USIM and the second USIM are in the UE (e.g., both the first USIM and the second USIM are in the same UE), the first state corresponding to the first USIM is connected state (e.g., RRC_CONNECTED state), the second state corresponding to the second USIM is idle state (e.g., RRC_IDLE state) and/or inactive state (e.g., RRC_INACTIVE state), and/or the mobile-terminating activity associated with the second USIM has higher priority than the currently ongoing activity, the network may determine to instruct (and/or indicate to) the UE to release (and/or suspend) the RRC connection corresponding to the first USIM and/or to establish the second RRC connection corresponding to the second USIM. Alternatively and/or additionally, responsive to (and/or based on) the determination that the first USIM and the second USIM are in the UE (e.g., both the first USIM and the second USIM are in the same UE), the first state corresponding to the first USIM is connected state (e.g., RRC_CONNECTED state), the second state corresponding to the second USIM is idle state (e.g., RRC_IDLE state) and/or inactive state (e.g., RRC_INACTIVE state), and/or the mobile-terminating activity associated with the second USIM has higher priority than the currently ongoing activity, the network may determine to transmit an indication to the UE (such as in a message, e.g., a dedicated message, a RRC message and/or a paging message for the second USIM to the UE). The indication may be indicative of the UE releasing and/or suspending the RRC connection corresponding to the first USIM and/or the UE establishing the second RRC connection corresponding to the second USIM.

Alternatively and/or additionally, in an example where the network corresponds to a CN node, responsive to (and/or based on) the determination that the first USIM and the second USIM are in the UE (e.g., both the first USIM and the second USIM are in the same UE), the first state corresponding to the first USIM is connected state (e.g., RRC_CONNECTED state), the second state corresponding to the second USIM is idle state (e.g., RRC_IDLE state) and/or inactive state (e.g., RRC_INACTIVE state), and/or the mobile-terminating activity associated with the second USIM has higher priority than the currently ongoing activity, the CN node may determine to instruct (and/or indicate to) a RAN node to release (and/or suspend) the RRC connection corresponding to the first USIM and/or to establish the second RRC connection corresponding to the second USIM.

Alternatively and/or additionally, responsive to (and/or based on) the determination that the first USIM and the second USIM are in the UE (e.g., both the first USIM and the second USIM are in the same UE), the first state corresponding to the first USIM is connected state (e.g., RRC_CONNECTED state), the second state corresponding to the second USIM is idle state (e.g., RRC_IDLE state) and/or inactive state (e.g., RRC_INACTIVE state), and/or the mobile-terminating activity associated with the second USIM has higher priority than the currently ongoing activity, the CN node may determine to transmit an indication to the RAN node (such as in a message, e.g., a dedicated message, a RRC message and/or a paging message for the second USIM to the UE). The indication may be indicative of the UE releasing and/or suspending the RRC connection corresponding to the first USIM and/or the UE establishing the second RRC connection corresponding to the second USIM. In the example where the network corresponds to the CN node, the RAN node may correspond to a RAN node that controls the serving cell corresponding to the first USIM.

Alternatively and/or additionally, in an example where the network corresponds to a RAN node, responsive to (and/or based on) the determination that the first USIM and the second USIM are in the UE (e.g., both the first USIM and the second USIM are in the same UE), the first state corresponding to the first USIM is connected state (e.g., RRC_CONNECTED state), the second state corresponding to the second USIM is idle state (e.g., RRC_IDLE state) and/or inactive state (e.g., RRC_INACTIVE state), and/or the mobile-terminating activity associated with the second USIM has higher priority than the currently ongoing activity, the RAN node may determine to instruct (and/or indicate to) the UE to release (and/or suspend) the RRC connection corresponding to the first USIM and/or to establish the second RRC connection corresponding to the second USIM. Alternatively and/or additionally, responsive to (and/or based on) the determination that the first USIM and the second USIM are in the UE (e.g., both the first USIM and the second USIM are in the same UE), the first state corresponding to the first USIM is connected state (e.g., RRC_CONNECTED state), the second state corresponding to the second USIM is idle state (e.g., RRC_IDLE state) and/or inactive state (e.g., RRC_INACTIVE state), and/or the mobile-terminating activity associated with the second USIM has higher priority than the currently ongoing activity, the RAN node may determine to transmit an indication to the UE (such as in a message, e.g., a dedicated message, a RRC message and/or a paging message for the second USIM to the UE). The indication may be indicative of the UE releasing and/or suspending the RRC connection corresponding to the first USIM and/or the UE establishing the second RRC connection corresponding to the second USIM. In the example where the network corresponds to the RAN node, the RAN node may correspond to a RAN node that controls the serving cell corresponding to the first USIM.

Alternatively and/or additionally, the network may determine that the first state corresponding to the first USIM is idle state (e.g., RRC_IDLE state) and/or inactive state (e.g., RRC_INACTIVE state) (and/or that the second state corresponding to the second USIM is idle state and/or inactive state). In some embodiments, responsive to the determination that the first state corresponding to the first USIM is idle state and/or inactive state (and/or that the second state corresponding to the second USIM is idle state and/or inactive state), the network may transmit a paging message for the second USIM to the UE.

In an example where the UE is capable of maintaining more than one RRC connection at the same time (and/or the network determines that the first state corresponding to the first USIM is connected state), the network may instruct (and/or indicate to) the UE to establish the second RRC connection corresponding to the second USIM without releasing (and/or suspending) the RRC connection corresponding to the first USIM. Alternatively and/or additionally, in an example where the UE is capable of maintaining only a single RRC connection at a time (and/or the network determines that the first state corresponding to the first USIM is connected state), the network may instruct (and/or indicate to) the UE to switch from the RRC connection corresponding to the first USIM to the second RRC connection corresponding to the second USIM. For example, the network may transmit an indication to the UE, where the indication is indicative of (and/or comprises instructions for) the UE switching from the RRC connection corresponding to the first USIM to the second RRC connection corresponding to the second USIM.

In some embodiments, the network transmits an indication to the UE. In some embodiments, the indication may be indicative of (and/or comprises instructions for) the UE releasing and/or suspending the RRC connection corresponding to the first USIM and/or the UE establishing the second RRC connection corresponding to the second USIM. Alternatively and/or additionally, the indication may be indicative of (and/or comprises instructions for) the UE switching from the RRC connection corresponding to the first USIM to the second RRC connection corresponding to the second USIM. In some embodiments, the indication is transmitted via a dedicated message, such as a dedicated RRC message (e.g., at least one of a RRCRelease message discussed in 3GPP TS 38.331 V15.5.1, a DLInformationTransfer message discussed in 3GPP TS 38.331 V15.5.1, a RRCConnectionRelease message discussed in 3GPP TS 36.331 V15.5.1, etc.). Alternatively and/or additionally, the indication may be transmitted via a paging message. In some embodiments, the UE ID associated with the second USIM may be included in the dedicated message. In some embodiments, the dedicated message is dedicated to the UE. For example, the dedicated message may be provided (to the UE) via a dedicated signaling, a unicast transmission and/or a UE-specific signaling (and/or a UE-specific transmission).

Alternatively and/or additionally, when activity (e.g., mobile-terminating activity) occurs for the second USIM, if the first USIM and the second USIM belong to the same operator (and/or the same MNO), the network may transmit data for the activity to the UE via the RRC connection corresponding to the first USIM. A priority of the activity may be higher than a priority of the currently ongoing activity performed using the RRC connection corresponding to the first USIM. For example, the network may transmit the data for the activity to the UE via the RRC connection corresponding to the first USIM responsive to a determination that the priority of the activity is higher than the priority of the currently ongoing activity. Alternatively and/or additionally, the priority of the activity may be lower than the priority of the currently ongoing activity performed using the RRC connection corresponding to the first USIM. For example, the network may transmit the data for the activity to the UE via the RRC connection corresponding to the first USIM responsive to a determination that the priority of the activity is lower than the priority of the currently ongoing activity. Alternatively and/or additionally, the priority of the activity may be equal to the priority of the currently ongoing activity performed using the RRC connection corresponding to the first USIM. For example, the network may transmit the data for the activity to the UE via the RRC connection corresponding to the first USIM responsive to a determination that the priority of the activity is equal to the priority of the currently ongoing activity.

In some embodiments, the UE may report one or more preferences (e.g., user preferences) associated with service prioritization to the network to enable the network to determine (and/or understand) priorities of activities, such as the priority of the activity for the second USIM and/or the priority of the currently ongoing activity. The one or more preferences may be set by a user of the UE. The one or more preferences may be indicative of preferences, of the user, related to prioritization among services. For example, the one or more preferences may be indicative of one or more services that should be prioritized over one or more other services and/or one or more services that should be de-prioritized under one or more other services (and/or the one or more preferences may be indicative of an order of prioritization of services). The one or more preferences may be reported to the network during registration to the network. (e.g., Attach and/or Service Request). The registration may be associated with one of the USIMs of the UE (e.g., the first USIM or the second USIM). For example, the registration may correspond to registration of the first USIM or the second USIM to the network. The one or more preferences (and/or an updated version of the one or more preferences) may be reported to the network when the one or more preferences are changed and/or updated.

In some embodiments, the network may determine whether to perform and/or apply one or more second actions based on UE reporting, such as the one or more preferences and/or other information reported by the UE to the network. The one or more second actions may comprise one or more actions described herein with respect to Embodiment 1, such as the one or more first actions, one or more actions described with respect to FIG. 9 and/or FIG. 10, one or more actions associated with using the current active DL BWP and/or the initial DL BWP for paging, one or more actions associated with transmitting the indication to the UE, one or more actions associated with instructing (and/or indicating to) the UE to release (and/or suspend) the RRC connection corresponding to the first USIM, one or more actions associated with instructing (and/or indicating to) the UE to establish the second RRC connection corresponding to the second USIM, one or more actions associated with transmitting data for the activity to the UE via the RRC connection corresponding to the first USIM based on the priority of the activity for the second USIM and/or the priority of the currently ongoing activity and/or one or more other actions described herein with respect to Embodiment 1, such as in the foregoing description and/or the following description. In an example, the priority of the activity for the second USIM and/or the priority of the currently ongoing activity may be determined based on the one or more preferences. Alternatively and/or additionally, whether the priority of the activity for the second USIM is higher than, lower than, or equal to the priority of the currently ongoing activity may be determined based on the one or more preferences, such as by determining whether a service associated with the activity for the second USIM is prioritized over, de-prioritized under, or prioritized at a same level as the currently ongoing activity. For example, if a service (e.g., a newly occurred service, such as corresponding to the activity for the second USIM) occurs and a priority of the service is higher than a priority of a currently ongoing service in the UE (e.g., the currently ongoing activity, such as performed using the RRC connection corresponding to the first USIM), the network may determine to transmit data for the service to the UE (and/or the network may interrupt the currently ongoing service). For example, the network may transmit the data to the UE, such as via the RRC connection corresponding to the first USIM (and/or via a different connection). Alternatively and/or additionally, if a service (e.g., a newly occurred service, such as corresponding to the activity for the second USIM) occurs and a priority of the service is lower than a priority of a currently ongoing service in the UE (e.g., the currently ongoing activity, such as performed using the RRC connection corresponding to the first USIM), the network may suspend the service. For example, the network may suspend the service until the currently ongoing service in the UE is finished.

In some embodiments, such as embodiments described herein with respect to Embodiment 1, the network may be a CN node (e.g., an AMF) or a RAN node (e.g., a NG-RAN node and/or a gNB).

In some embodiments, such as embodiments described herein with respect to Embodiment 1, the UE may have a single receiver. Alternatively and/or additionally, the UE may have a dual receiver.

In some embodiments, such as embodiments described herein with respect to Embodiment 1, the paging may be a signaling transmitted on PDCCH addressed to a Paging Radio Network Temporary Identifier (P-RNTI).

In some embodiments, such as embodiments described herein with respect to Embodiment 1, the paging monitoring is performed in a serving cell associated with a USIM of the UE, such as the first USIM or the second USIM.

In some embodiments, such as embodiments described herein with respect to Embodiment 1, a RRC state (of the UE) associated with the first USIM may be RRC_IDLE.

In some embodiments, such as embodiments described herein with respect to Embodiment 1, a RRC state (of the UE) associated with the first USIM may be RRC_INACTIVE.

In some embodiments, such as embodiments described herein with respect to Embodiment 1, a RRC state (of the UE) associated with the first USIM may be RRC_CONNECTED.

In some embodiments, such as embodiments described herein with respect to Embodiment 1, a RRC state (of the UE) associated with the second USIM may be RRC_IDLE.

In some embodiments, such as embodiments described herein with respect to Embodiment 1, a RRC state (of the UE) associated with the second USIM may be RRC_INACTIVE.

In some embodiments, such as embodiments described herein with respect to Embodiment 1, a RRC state (of the UE) associated with the second USIM may be RRC_CONNECTED.

In some embodiments, such as embodiments described herein with respect to Embodiment 1, the UE ID associated with the first USIM may be an International Mobile Subscriber Identity (IMSI).

In some embodiments, such as embodiments described herein with respect to Embodiment 1, the UE ID associated with the first USIM may be a S-TMSI.

In some embodiments, such as embodiments described herein with respect to Embodiment 1, the UE ID associated with the first USIM may be a 5G-S-TMSI.

In some embodiments, such as embodiments described herein with respect to Embodiment 1, the UE ID associated with the second USIM may be an IMSI.

In some embodiments, such as embodiments described herein with respect to Embodiment 1, the UE ID associated with the second USIM may be a S-TMSI.

In some embodiments, such as embodiments described herein with respect to Embodiment 1, the UE ID associated with the second USIM may be a 5G-S-TMSI.

In some embodiments, such as embodiments described herein with respect to Embodiment 1, the network may be a base station, an eNB, a gNB, or an AMF.

Based on RP-191304 and RP-190833, a procedure for cell selection and/or reselection may be enhanced for a multi-USIM device comprising multiple USIMs that belong to the same operator (and/or the same MNO) by sharing the same cell search and/or measurement associated with one USIM of the multiple USIMs with one or more other USIMs of the multiple USIMs. However, as illustrated in FIG. 8, paging monitoring and reception (e.g., monitoring for paging messages and reception of paging messages) for each USIM still needs to be performed independently. The timing to monitor paging (e.g., the timing may correspond to one or more paging frames and/or one or more paging occasions, such as discussed in 3GPP TS 38.304 V15.3.0) for a USIM is derived using a UE ID (e.g., 5G-S-TMSI) associated with the USIM. In such a scenario, a multi-USIM UE monitors paging for each USIM independently which may waste UE power of the multi-USIM UE (e.g., the multi-USIM UE may monitor paging for each USIM independently due to different 5G-S-TMSI for different USIMs of the multi-USIM UE).

Moreover, in a scenario where the multi-USIM UE cannot monitor paging for multiple USIMs simultaneously (due to the multi-USIM UE comprising a single receiver, for example) and where timings for monitoring paging for different USIMs are overlapped with each other (e.g., a first paging occasion associated with a first USIM overlaps with a second paging occasion associated with a second USIM), one or more paging collision problems may occur and one or more paging messages for a USIM of the multi-USIM UE may be lost due to collision of paging monitoring for the different USIMs. One or more of the techniques presented herein, such as one or more techniques described below with respect to Embodiment 2 and/or one or more other techniques described herein, may be implemented to solve one or more of the discussed issues associated with multi-USIM UE operation, such as one or more of the paging collision problems, the inefficient power consumption of the UE, etc.

Embodiment 2

In Embodiment 2 of the present disclosure, for a UE (e.g., a multi-USIM UE) with multiple USIMs comprising a first USIM and a second USIM, the UE may follow a common time domain pattern (e.g., one or more paging frames and/or one or more paging occasions, such as discussed in 3GPP TS 38.304 V15.3.0) to monitor paging for the first USIM and paging for the second USIM. The common time domain pattern (and/or the one or more paging frames and/or the one or more paging occasions corresponding to the common time domain pattern) may be derived using a UE ID (e.g., a S-TMSI and/or a 5G-S-TMSI) associated with one USIM of the multiple USIMs, such as the first USIM or the second USIM. The UE may monitor paging, such as paging for the first USIM and/or paging for the second USIM in a serving cell associated with the one USIM of the multiple USIMs. The UE may monitor the paging for the first USIM and the paging for the second USIM at the common time domain pattern, such as at the one or more paging frames and/or the one or more paging occasions corresponding to the common time domain pattern. The UE may monitor the paging for the first USIM and the paging for the second USIM on one or more frequency resources (e.g., the one or more frequency resources on which the UE monitors the paging for the first USIM may be the same as the one or more frequency resources on which the UE monitors the paging for the second USIM). The UE may not need to monitor paging, such as in the serving cell, outside the common time domain pattern (e.g., the UE may not need to monitor paging in the serving cell at paging frames and/or paging occasions other than the one or more paging frames and/or the one or more paging occasions corresponding to the common time domain pattern). The UE may use a single receiver to monitor and/or receive the paging for the first USIM and the paging for the second USIM. The first USIM and the second USIM may belong to the same operator (and/or the same MNO). Paging for the first USIM and paging for the second USIM may be delivered to the UE at one or more paging occasions, such as one or more paging occasions corresponding to the common time domain pattern (e.g., the one or more paging occasions at which the paging for the first USIM is delivered to the UE may be the same as the one or more paging occasions at which the paging for the second USIM is delivered to the UE). When the UE monitors paging at the common time domain pattern, the UE may receive a paging message, such as at a paging occasion and/or a paging frame corresponding to the common time domain pattern. The UE may analyze (and/or check) a UE ID included in the paging message, such as to determine whether the UE ID matches a first UE ID associated with the first USIM or the UE ID matches a second UE ID associated with the second USIM. Responsive to a determination that the UE ID included in the paging message matches the first UE ID associated with the first USIM or the second UE ID associated with the second USIM, UE RRC of the UE (e.g., a RRC layer of the UE) may indicate, to an upper layer (e.g., an upper layer of the UE RRC, such as NAS), that a paging message for the UE ID is received. The UE may respond to the paging message, and/or determine whether to respond to the paging message, such as based on a service priority associated with the paging message.

In some embodiments, a serving cell for the first USIM and a serving cell for the second USIM may be the same. Alternatively and/or additionally, the serving cell for the first USIM and the serving cell for the second USIM may be different. In some embodiments, a RAT of the serving cell for the first USIM may be different than a RAT of the serving cell for the second USIM (e.g., one of the RATs may correspond to NR and another one of the RATs may correspond to E-UTRAN and/or LTE).

Figure 11:
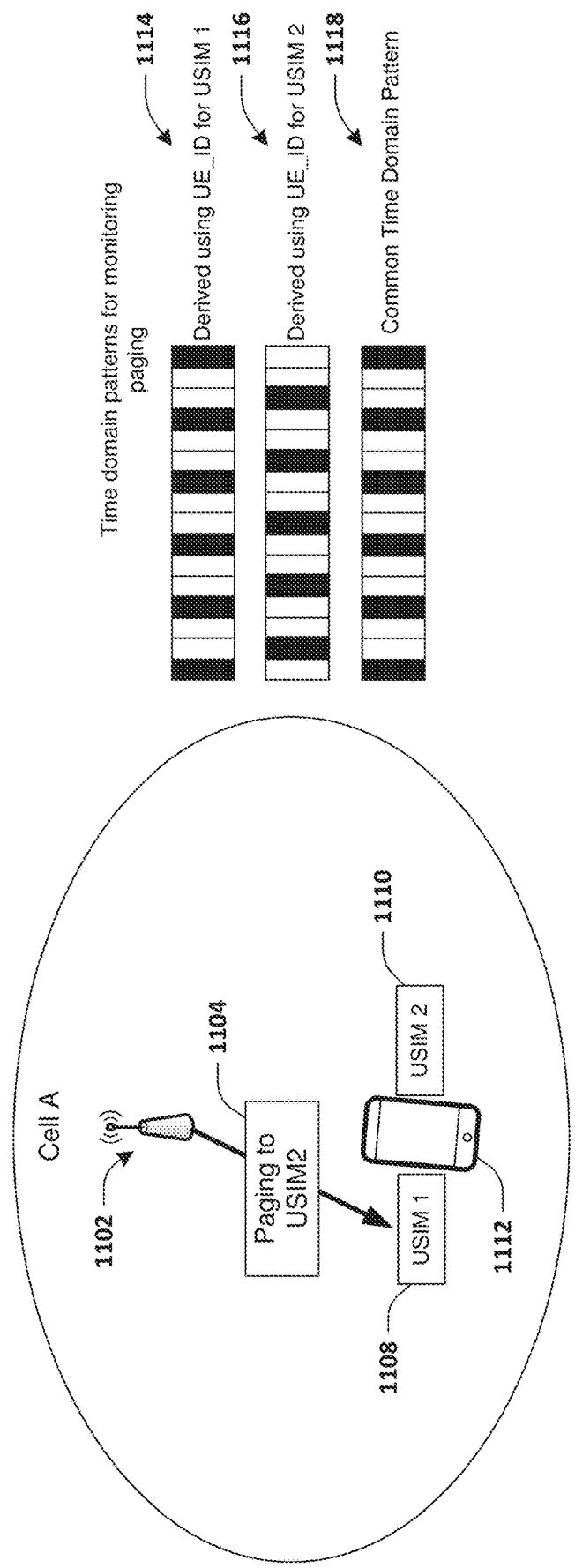
FIG. 11 is a diagram illustrating an exemplary scenario associated with a multi-USIM device, according to one exemplary embodiment.

FIG. 11 illustrates an exemplary scenario in accordance with one or more embodiments provided herein. A UE 1112 (e.g., a multi-USIM UE) is equipped with two USIMs, such as a first USIM 1108 ("USIM 1") and a second USIM 1110 ("USIM 2"). The UE 1112 uses a common time domain pattern 1118 to monitor paging for the first USIM 1108 and paging for the second USIM 1110. For example, the UE 1112 may monitor paging at one or more paging frames and/or one or more paging occasions corresponding to the common time domain pattern 1118 (e.g., the one or more paging frames and/or the one or more paging occasions are shown in black in FIG. 11, and/or other paging frames and/or other paging occasions at which the UE 1112 does not monitor paging are shown in white in FIG. 11). In the exemplary scenario of FIG. 11, the common time domain pattern 1118 is the same as a first time domain pattern 1114 derived using a first UE ID associated with the first USIM 1108 (e.g., the one or more paging frames and/or the one or more paging occasions at which the UE 1112 monitors paging may be derived and/or determined using the first UE ID associated with the first USIM 1108). In the exemplary scenario of FIG. 11, the UE 1112 may not derive the common time domain pattern 1118 using a second UE ID associated with the second USIM 1110 (e.g., the one or more paging frames and/or the one or more paging occasions at which the UE 1112 monitors paging may not be derived and/or may not be determined using the second UE ID associated with the second USIM 1110). For example, the common time domain pattern 1118 may not be the same as a second time domain pattern 1116 that may be derived using the second UE ID associated with the second USIM 1110. Alternatively and/or additionally, the UE 1112 may not monitor paging at the second time domain pattern 1116 (and/or the UE 1112 may not monitor paging at one or more second paging frames and/or one or more second paging occasions that are derived and/or determined using the second UE ID associated with the second USIM 1110). In the exemplary scenario of FIG. 11, the two USIMs may belong to the same operator (and/or the same MNO). When a network 1102 wants to page the second USIM 1110, the network 1102 transmits a paging message 1104, comprising the second UE ID associated with the second USIM 1110, to the UE 1112 at a time included in the common time domain pattern 1118 derived using the first UE ID associated with the first USIM 1108. For example, the time at which the network 1102 transmits the paging message 1104 comprising the second UE ID may correspond to a paging frame of the one or more paging frames corresponding to the common time domain pattern 1118 and/or a paging occasion of the one or more paging occasions corresponding to the common time domain pattern 1118. From the perspective of the UE 1112, the UE 1112 monitors paging for the first USIM 1108 and the second USIM 1110 at times (such as the one or more paging frames and/or the one or more paging occasions) in accordance with the common time domain pattern 1118 derived using the first UE ID associated with the first USIM 1108. If the UE 1112 receives a paging message, such as the paging message 1104, comprising the second UE ID associated with the second USIM 1110, the UE 1112 may establish a RRC connection (e.g., a RRC connection with the network 1102 associated with the second USIM 1110) and transmit a signalling of paging response (e.g., the UE 1112 may transmit a signal, responsive to the paging message, via the RRC connection to the network 1102). Alternatively and/or additionally, the UE 1112 may determine whether to respond to the paging message, such as based on at least one of paging cause (e.g., a cause of the paging message), a service priority associated with the paging message, etc.

It may be appreciated that using a single time domain pattern for monitoring paging associated with multiple USIMs, such as using one or more techniques provided herein with respect to FIG. 11 and/or one or more other techniques provided herein with respect to Embodiment 2, leads to more efficient UE operation and/or less power consumption by a UE (e.g., a multi-USIM) as compared to systems where paging monitoring is performed independently for different USIMs, such as using different time domain patterns for the different USIMs. The UE may use a single receiver to monitor and/or receive paging for multiple USIMs. In scenarios where time domain patterns (for monitoring paging) derived from UE IDs of different USIMs are overlapped with each other, the paging collision problem associated with such scenarios may be solved since paging for the different USIMs may be received by the single receiver at the same time.

A UE (e.g., a multi-USIM UE) may indicate, to a network, a capability and/or a preference related to using the same time domain pattern for monitoring paging for multiple USIMs of the UE, such as comprising a first USIM and a second USIM. The capability may indicate that the UE is capable of using (and/or following) a single time domain pattern for monitoring paging associated with multiple USIMs (e.g., the capability may indicate that the UE is capable of monitoring paging in accordance with the single time domain pattern). The preference may indicate that the UE prefers (or does not prefer) to use a single time domain pattern for monitoring paging associated with multiple USIMs. Alternatively and/or additionally, the UE may indicate, to the network, one or more USIMs of the UE that can (and/or should) share the single time domain pattern, such as by transmitting, to the network, a first indication of the one or more USIMs of the UE that can (and/or should) share the single time domain pattern. Alternatively and/or additionally, the UE may indicate, to the network, one or more USIMs of the UE that will share the single time domain pattern, such as by transmitting, to the network, a second indication of the one or more USIMs of the UE that will share the single time domain pattern. The first indication and/or the second indication (and/or an indication comprising the capability and/or the preference) may enable the network to deliver a paging message for one USIM (e.g., the second USIM) at a time (e.g., a paging frame and/or a paging occasion) corresponding to a time domain pattern derived using a UE ID associated with another USIM (e.g., the first USIM). The UE may transmit the first indication and/or the second indication (and/or the indication comprising the capability and/or the preference) to the network during registration to the network (e.g., Attach and/or Service Request). The registration may be associated with one of the USIMs (e.g., the first USIM or the second USIM). For example, the registration may correspond to registration of the first USIM or the second USIM to the network. The UE may transmit the first indication, the second indication (and/or the indication comprising the capability and/or the preference) to the network during (and/or before and/or after) change of a registration area (e.g., a tracking area and/or a RAN notification area). The registration area may be associated with one of the USIMs (e.g., the first USIM or the second USIM).

A paging message for a UE (e.g., a paging message for a USIM of a multi-USIM UE) may originate from a CN (e.g., the paging message may be associated with CN paging). For example, the paging message may be transmitted when the UE is in idle mode (and/or when a RRC state, of the UE, corresponding to a USIM of the UE is idle state and/or idle mode). In some embodiments, when a mobile-terminating activity for the UE occurs, a CN node (e.g., an AMF) may indicate, to a RAN node (e.g., a NG-RAN node and/or a gNB), which UE ID and/or USIM of the UE needs to be paged and which UE ID of the UE is used to derive one or more paging occasions and/or one or more paging frames (and/or a time domain pattern) for transmitting and/or indicating paging to the UE. In an example, the CN node may indicate, to the RAN node, that a first UE ID of the UE (and/or a first USIM of the UE associated with the first UE ID) needs to be paged and/or that a second UE ID of the UE is used to derive one or more paging occasions and/or one or more paging frames (and/or a time domain pattern) for transmitting and/or indicating paging to the UE. The two UE IDs may be different (e.g., the first UE ID may be different than the second UE ID). Alternatively and/or additionally, the two UE IDs may be the same (e.g., the first UE ID may be the same as the second UE ID). Alternatively and/or additionally, if the second UE ID (that is used to derive the one or more paging occasions and/or the one or more paging frames) is the same as the first UE ID to be paged, the CN node may indicate merely a single UE ID of the UE to the RAN node.

In an example of CN paging, when a mobile-terminating activity for the first UE ID (associated with a first USIM of the UE) occurs, a CN node (e.g., an AMF) indicates to a RAN node (e.g., a NG-RAN node and/or a gNB) that the first UE ID (and/or the first USIM associated with the first UE ID) needs to be paged and that paging occasions and/or paging frames for paging the first UE ID (and/or the first USIM) should be derived from the second UE ID (associated with a second USIM of the UE). Signaling (e.g., a signal indicating that the first UE ID needs to be paged and/or that the paging occasions and/or paging frames for paging the first UE ID should be derived from the second UE ID) that the CN node transmits to the RAN node may be a paging message (such as discussed in 3GPP TS 38.413 V15.3.0). The RAN node then generates a paging message for the first UE ID (and/or the first USIM) and transmits the paging message to the UE at one or more paging occasions of the paging occasions derived using the second UE ID (and/or the paging message may be transmitted to the UE at one or more paging frames of the paging frames derived using the second UE ID). The paging message that the RAN node transmits to the UE may be similar to the paging message specified in 3GPP TS 38.331 V15.5.1.

A paging message for a UE (e.g., a paging message for a USIM of a multi-USIM UE) may originate from a RAN (e.g., the paging message may be associated with RAN paging). For example, the paging message may be transmitted when the UE is in inactive state (and/or when a RRC state, of the UE, corresponding to a USIM of the UE is inactive state). In an example of RAN paging, when some data for a first UE ID (and/or for a first USIM associated with the first UE ID) arrives at CN, a CN node transmits the data for the first UE ID (associated with the first USIM) to a RAN node (e.g., a NG-RAN node and/or a gNB). In the example of RAN paging, after receiving the data, the RAN node determines that the UE is in inactive state (and/or that the RRC state, of the UE, corresponding to a USIM of the UE is inactive state) and generates a paging message for the first UE ID (and/or for the first USIM associated with the first UE ID). The RAN node may then transmit the paging message to the UE at one or more paging occasions of paging occasions derived using a second UE ID associated with a second USIM of the UE. The paging message may be similar to the paging message specified in 3GPP TS 38.331 V15.5.1.

In some embodiments, a UE with multiple USIMs (comprising a first USIM and a second USIM) camps on multiple serving cells, where a first serving cell of the multiple serving cells corresponds to the first USIM and a second serving cell of the multiple serving cells corresponds to the second USIM. In such a scenario, a first RAN node (which controls the first serving cell) may indicate to a second RAN node (which controls the second serving cell) that a first UE ID (associated with the first USIM) needs to be paged and that paging occasions for the first UE ID should be derived using a second UE ID (associated with the second USIM). Alternatively and/or additionally, the first RAN node may generate a paging message for the first UE ID (and/or the first USIM associated with the first UE ID) and transmit the paging message to the second RAN node. Alternatively and/or additionally, the first RAN node may indicate to the second RAN node information related to a time domain pattern used for transmission of the paging message to the UE (e.g., the time domain pattern may correspond to one or more paging frames and/or one or more paging occasions). The first RAN node may be a NG-RAN node and/or a gNB. The second RAN node may be a NG-RAN node and/or a gNB.

In some embodiments, handshaking may be performed by the UE and the network to ensure that the UE and the network apply the same time domain pattern (and/or to ensure that the UE and the network have the same understanding of the time domain pattern for paging monitoring and paging message transmission), such that both paging monitoring performed by the UE and transmission of paging messages by the network are performed in accordance with the time domain pattern (e.g., the UE monitors paging at one or more times associated with the time domain pattern and/or the network transmits one or more paging messages at the one or more times at which the UE monitors paging). In some embodiments, the handshaking may comprise communication of data between the UE and the network, where the data is indicative of the time domain pattern (e.g., the data may comprise the time domain pattern and/or the data may be used by the UE and/or the network to derive the time domain pattern). The handshaking may be performed during registration to the network (e.g., Attach and/or Service Request). The registration may be associated with one of the USIMs of the UE (e.g., the first USIM or the second USIM). For example, the registration may correspond to registration of the first USIM or the second USIM to the network. The handshaking may be performed while (and/or before and/or after) the UE changes a registration area (e.g., a tracking area and/or a RAN notification area). The registration area may be associated with one of the USIMs (e.g., the first USIM or the second USIM). The network may be a CN node (e.g., an AMF) and/or a RAN node (e.g., a NG-RAN node and/or a gNB).

One or more techniques for determining the time domain pattern for monitoring paging are provided herein.

In some embodiments, a common time domain pattern is determined by the network. The common time domain pattern may be indicative of one or more paging occasions and/or one or more paging frames at which paging monitoring is performed by the UE and/or paging message transmission is performed by the network.

In an example where the common time domain pattern is determined by the network, the UE may transmit a request to the network requesting the common time domain pattern. The UE may suggest and/or provide, to the network, one or more preferred time domain patterns for monitoring paging in the request. In response to the request, the network may transmit a response to the UE indicating the common time domain pattern to be applied (by the UE for monitoring paging and/or by the network for paging message transmission). The response may comprise the common time domain pattern and/or information used to derive the common time domain pattern. For example, the information (used to derive the common time domain pattern) may be (and/or may indicate) a UE ID or an identity of the UE ID for use in deriving the common time domain pattern. The UE may transmit an acknowledgement of the response to the network (e.g., the network may determine that the response is received successfully by the UE based on reception of the acknowledgment from the UE). Alternatively and/or additionally, the UE may not transmit an acknowledgement of the response to the network.

In an example where the common time domain pattern is determined by the network, the network may transmit a signaling to the UE indicating the common time domain pattern to be applied (by the UE for monitoring paging and/or by the network for paging message transmission). The network may transmit the signaling without receiving a request from the UE (e.g., the signaling may not be responsive to a request from the UE). In response to receiving the signaling, the UE may transmit an acknowledgement of the signaling to the network (e.g., the network may determine that the response is received successfully by the UE based on reception of the acknowledgment from the UE). Alternatively and/or additionally, in response to receiving the signaling, the UE may transmit a response to the network (e.g., the response may comprise a confirmation that the signaling is received by the UE and/or a confirmation to apply the common time domain pattern for monitoring paging).

In some embodiments, the network may be a CN node (e.g., an AMF) and/or a RAN node (e.g., a NG-RAN node and/or a gNB).

In some embodiments, the common time domain pattern is determined by the UE.

In an example where the common time domain pattern is determined by the UE, the UE may determine a common time domain pattern, and transmit a message to indicate the common time domain pattern to the network (e.g., the message may be indicative of the common time domain pattern and/or may be transmitted to the network). The message may comprise the common time domain pattern and/or information used to derive the common time domain pattern. For example, the information (used to derive the common time domain pattern) may be (and/or may indicate) a UE ID or an identity of the UE ID for use in deriving the common time domain pattern. Responsive to receiving the message, the network may transmit a response to the UE (e.g., the response may comprise a confirmation and/or an acknowledgement that the message is received by the network and/or a confirmation to apply the common time domain pattern for paging message transmission). The response may be used to accept or reject the common time domain pattern determined by the UE (e.g., the response may indicate that the network accepts the common time domain pattern and will use the common time domain pattern for paging message transmission or the response may indicate that the network rejects the common time domain pattern and will not use the common time domain pattern for paging message transmission).

In some embodiments, the network may be a CN node (e.g., an AMF) and/or a RAN node (e.g., a NG-RAN node and/or a gNB).

In some embodiments, the common time domain pattern is determined based on one or more predefined rules.

In an example where the common time domain pattern is determined based on the one or more predefined rules, a UE ID associated with a specific USIM (e.g., the first USIM) is used for deriving the common time domain pattern. A rule of the one or more predefined rules may correspond to using a lowest UE ID, among multiple UE IDs associated with the multiple USIMs of the UE, for deriving the common time domain pattern. For example, the lowest UE ID among the multiple UE IDs may be used for deriving the common time domain pattern. Alternatively and/or additionally, a rule of the one or more predefined rules may correspond to using a highest UE ID among the multiple UE IDs for deriving the common time domain pattern. For example, the highest UE ID among the multiple UE IDs may be used for deriving the common time domain pattern. Alternatively and/or additionally, a rule of the one or more predefined rules may correspond to using a time domain pattern, among multiple time domain patterns derived using the multiple UE IDs, that has the fewest opportunities for monitoring paging in comparison with other time domain patterns of the multiple time domain patterns (e.g., an opportunity may correspond to a paging frame and/or a paging occasion). For example, the common time domain pattern may be determined to be the time domain pattern, of the multiple time domain patterns, with the fewest opportunities for monitoring paging. Each time domain pattern of the multiple domain pattern may be derived using a UE ID of the multiple UE IDs. Alternatively and/or additionally, a rule of the one or more predefined rules may correspond to using a time domain pattern, among multiple time domain patterns derived using the multiple UE IDs, that has the most opportunities for monitoring paging in comparison with other time domain patterns of the multiple time domain patterns. For example, the common time domain pattern may be determined to be the time domain pattern, of the multiple time domain patterns, with the most opportunities for monitoring paging. In some embodiments, by using the one or more predefined rules to determine the common time domain pattern, handshaking may not be performed by the UE and/or the network for determining the common time domain pattern (and/or handshaking may not be required to determine the common time domain pattern).

Using the common time domain pattern for monitoring paging and/or receiving paging messages associated with multiple USIMs (e.g., the first USIM and the second USIM) may be more suitable and/or useful in some circumstances than in other circumstances. Thus, application of the common time domain pattern for monitoring paging and/or receiving paging messages associated with the multiple USIMs may not be applied across all situations (e.g., application of the common time domain pattern for monitoring paging and/or receiving paging messages associated with the multiple USIMs may be restricted to certain situations). In some embodiments, when the common time domain pattern is not applied for monitoring paging and/or receiving paging messages associated with the multiple USIMs, the UE may monitor paging for each USIM of the multiple USIMs independently using multiple time domain patterns associated with the multiple USIMs. For example, the UE may monitor paging for the first USIM using a first time domain pattern associated with the first USIM (e.g., the first time domain pattern may be derived using a first UE ID associated with the first USIM) and monitor paging for the second USIM using a second time domain pattern associated with the second USIM (e.g., the second time domain pattern may be derived using a second UE ID associated with the second USIM).

The UE may determine whether to apply the common time domain pattern for monitoring paging and/or receiving paging messages associated with the multiple USIMs based on whether one or more conditions are met (e.g., the one or more conditions are fulfilled). For example, the UE may start applying the common time domain pattern for monitoring paging and/or receiving paging messages associated with the multiple USIMs if (and/or when) the one or more conditions are met (e.g., the UE applies the common time domain pattern for monitoring paging and/or receiving paging messages associated with the multiple USIMs responsive to a determination that the one or more conditions are met). Alternatively and/or additionally, the UE may stop applying the common time domain pattern for monitoring paging and/or receiving paging messages associated with the multiple USIMs if (and/or when) the one or more conditions are not met (e.g., the UE stops applying the common time domain pattern for monitoring paging and/or receiving paging messages associated with the multiple USIMs responsive to a determination that the one or more conditions are not met.

In some embodiments, the one or more conditions may comprise a first condition that a serving cell for the first USIM and a serving cell for the second USIM are the same serving cell. Alternatively and/or additionally, the one or more conditions may comprise a second condition that a RAT of the serving cell for the first USIM and a RAT of the serving cell for the second USIM are the same RAT. Alternatively and/or additionally, the one or more conditions may comprise a third condition that a tracking area for the first USIM and a tracking area for the second USIM are the same tracking area. Alternatively and/or additionally, the one or more conditions may comprise a fourth condition that a RAN notification area for the first USIM and a RAN notification area for the second USIM are the same RAN notification area. Alternatively and/or additionally, the one or more conditions may comprise a fifth condition that an operator (and/or a MNO) for the first USIM and an operator (and/or a MNO) for the second USIM are the same operator (and/or the same MNO). Alternatively and/or additionally, the one or more conditions may comprise a sixth condition that a state (e.g., a RRC state), of the UE, corresponding to the first USIM is idle state (e.g., RRC_IDLE state) and/or inactive state (e.g., RRC_INACTIVE state) and/or a state (e.g., a RRC state), of the UE, corresponding to the second USIM is idle state (e.g., RRC_IDLE state) and/or inactive state (e.g., RRC_INACTIVE state). In some embodiments, the one or more conditions may comprise the first condition, the second condition, the third condition, the fourth condition, the fifth condition, and the sixth condition.

In some embodiments, the UE may start applying the common time domain pattern for monitoring paging and/or receiving paging messages associated with the multiple USIMs if (and/or when) every condition of the one or more conditions are met (e.g., the UE may start applying the common time domain pattern for monitoring paging and/or receiving paging messages associated with the multiple USIMs responsive to a determination that every condition of the one or more conditions are met). Alternatively and/or additionally, the UE may start applying the common time domain pattern for monitoring paging and/or receiving paging messages associated with the multiple USIMs if (and/or when) at least one condition of the one or more conditions are met. In some embodiments, the UE may stop applying the common time domain pattern for monitoring paging and/or receiving paging messages associated with the multiple USIMs if (and/or when) every condition of the one or more conditions are not met. Alternatively and/or additionally, UE may stop applying the common time domain pattern for monitoring paging and/or receiving paging messages associated with the multiple USIMs if (and/or when) at least one condition of the one or more conditions is not met.

The network may determine whether to configure the common time domain pattern and/or provide the common time domain pattern to the UE based on whether one or more second conditions are met (e.g., the one or more second conditions are fulfilled). In some embodiments, the one or more second conditions may comprise one, some and/or all of the one or more conditions and/or one or more other conditions. For example, the network may configure the common time domain pattern if (and/or when) one, some and/or all of the one or more second conditions are met. Alternatively and/or additionally, the network may de-configure the common time domain pattern if (and/or when) one, some and/or all of the one or more second conditions are not met. Alternatively and/or additionally, the network may de-configure the common time domain pattern if (and/or when) one, some and/or all of the one or more second conditions (and/or one or more other conditions) are met.

In some embodiments, such as embodiments described herein with respect to Embodiment 2, the UE may have a single receiver. Alternatively and/or additionally, the UE may have a dual receiver.

In some embodiments, such as embodiments described herein with respect to Embodiment 2, the paging may be a signaling transmitted on PDCCH addressed to a P-RNTI.

In some embodiments, such as embodiments described herein with respect to Embodiment 2, the paging monitoring is performed in a serving cell associated with a USIM of the UE, such as the first USIM or the second USIM.

In some embodiments, such as embodiments described herein with respect to Embodiment 2, a RRC state (of the UE) associated with the first USIM may be RRC_IDLE.

In some embodiments, such as embodiments described herein with respect to Embodiment 2, a RRC state (of the UE) associated with the first USIM may be RRC_INACTIVE.

In some embodiments, such as embodiments described herein with respect to Embodiment 2, a RRC state (of the UE) associated with the first USIM may be RRC_CONNECTED.

In some embodiments, such as embodiments described herein with respect to Embodiment 2, a RRC state (of the UE) associated with the second USIM may be RRC_IDLE.

In some embodiments, such as embodiments described herein with respect to Embodiment 2, a RRC state (of the UE) associated with the second USIM may be RRC_INACTIVE.

In some embodiments, such as embodiments described herein with respect to Embodiment 2, a RRC state (of the UE) associated with the second USIM may be RRC_CONNECTED.

In some embodiments, such as embodiments described herein with respect to Embodiment 2, the UE ID associated with the first USIM may be an IMSI.

In some embodiments, such as embodiments described herein with respect to Embodiment 2, the UE ID associated with the first USIM may be a S-TMSI.

In some embodiments, such as embodiments described herein with respect to Embodiment 2, the UE ID associated with the first USIM may be a 5G-S-TMSI.

In some embodiments, such as embodiments described herein with respect to Embodiment 2, the UE ID associated with the second USIM may be an IMSI.

In some embodiments, such as embodiments described herein with respect to Embodiment 2, the UE ID associated with the second USIM may be a S-TMSI.

In some embodiments, such as embodiments described herein with respect to Embodiment 2, the UE ID associated with the second USIM may be a 5G-S-TMSI.

In some embodiments, such as embodiments described herein with respect to Embodiment 2, the network may be a CN node (e.g., an AMF) or a RAN node (e.g., a NG-RAN node and/or a gNB).

In some embodiments, such as embodiments described herein with respect to Embodiment 2, the network may be a base station, an eNB, a gNB, or an AMF.

In some embodiments, such as embodiments described herein with respect to Embodiment 2, the RAT (associated with the network and/or a serving cell of a USIM of the UE) may correspond to NR. Alternatively and/or additionally, the RAT may correspond to E-UTRAN.

One, some and/or all of the foregoing techniques and/or embodiments can be formed to a new embodiment.

In some examples, embodiments disclosed herein, such as embodiments described with respect to Embodiment 1 and Embodiment 2, may be implemented independently and/or separately. Alternatively and/or additionally, a combination of embodiments described herein, such as embodiments described with respect to Embodiment 1 and/or Embodiment 2, may be implemented. Alternatively and/or additionally, a combination of embodiments described herein, such as embodiments described with respect to Embodiment 1 and/or Embodiment 2, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Figure 12:
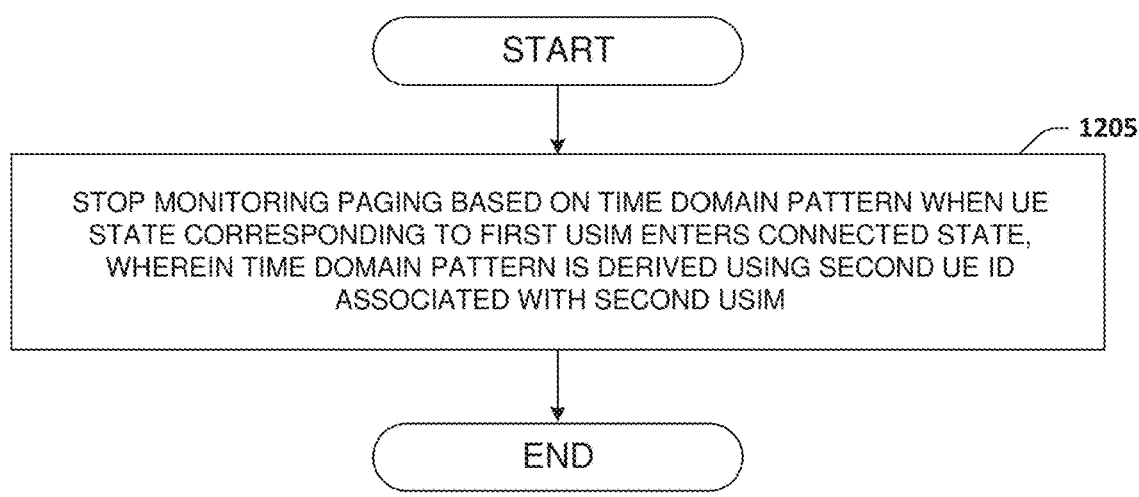
FIG. 12 is a flow chart according to one exemplary embodiment.

FIG. 12 is a flow chart 1200 according to one exemplary embodiment from the perspective of a UE with a first USIM and a second USIM. In step 1205, the UE stops monitoring paging based on a time domain pattern when a UE state corresponding to the first USIM enters connected state, wherein the time domain pattern is derived using a second UE ID associated with the second USIM.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to stop monitoring paging based on a time domain pattern when a UE state corresponding to the first USIM enters connected state, wherein the time domain pattern is derived using a second UE ID associated with the second USIM. Furthermore, the CPU 308 can execute the program code 312 to perform one, some and/or all of the above-described actions and steps and/or others described herein.

Figure 13:
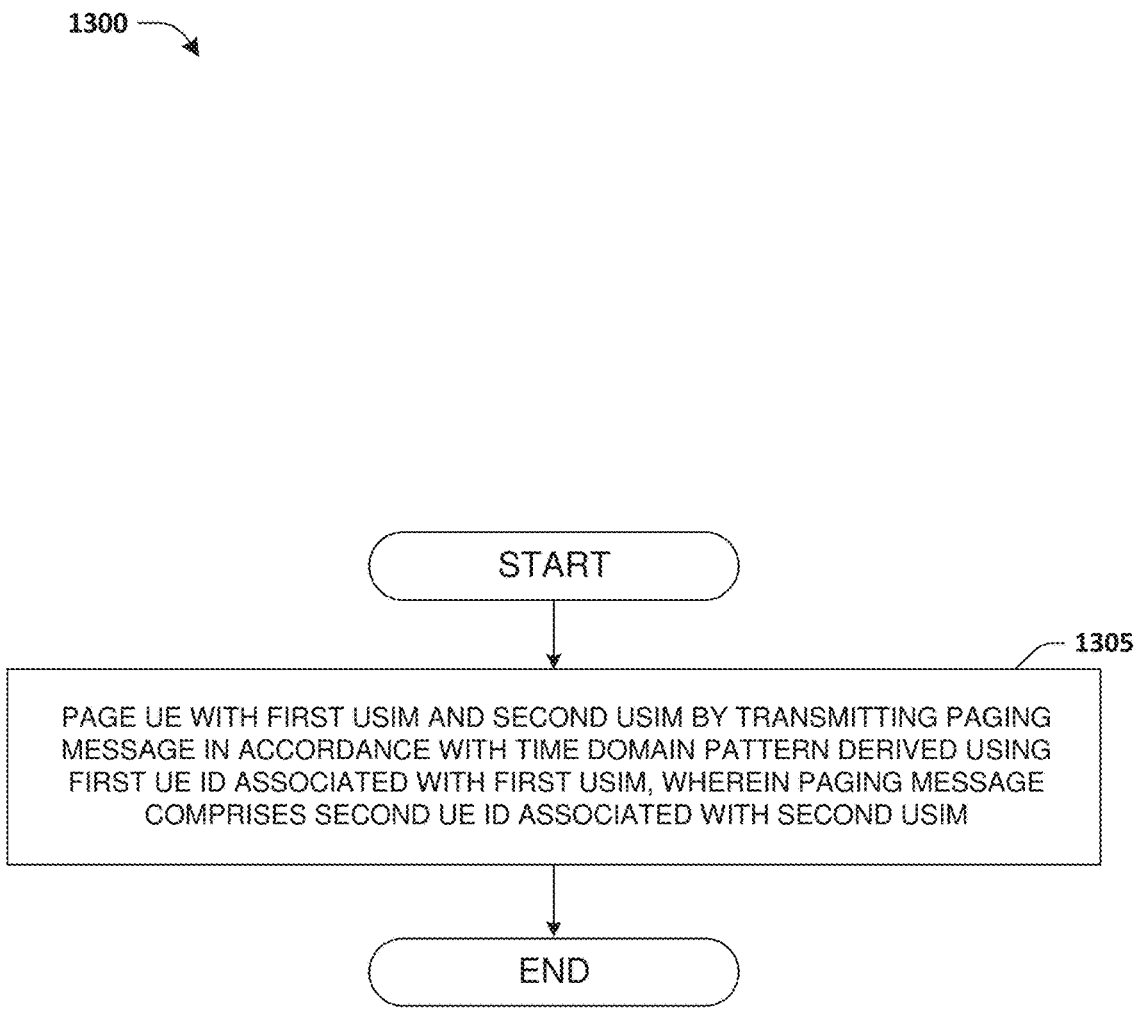
FIG. 13 is a flow chart according to one exemplary embodiment.

FIG. 13 is a flow chart 1300 according to one exemplary embodiment from the perspective of a network node. In step 1305, the network node pages a UE with a first USIM and a second USIM by transmitting a paging message in accordance with a time domain pattern derived using a first UE ID associated with the first USIM, wherein the paging message comprises a second UE ID associated with the second USIM.

Referring back to FIGS. 3 and 4, in one exemplary embodiment of a network node, the device 300 includes a program code 312 stored in the memory 310. The CPU 308 could execute program code 312 to enable the network node (i) to page a UE with a first USIM and a second USIM by transmitting a paging message in accordance with a time domain pattern derived using a first UE ID associated with the first USIM, wherein the paging message comprises a second UE ID associated with the second USIM. Furthermore, the CPU 308 can execute the program code 312 to perform one, some and/or all of the above-described actions and steps and/or others described herein.

Figure 14:
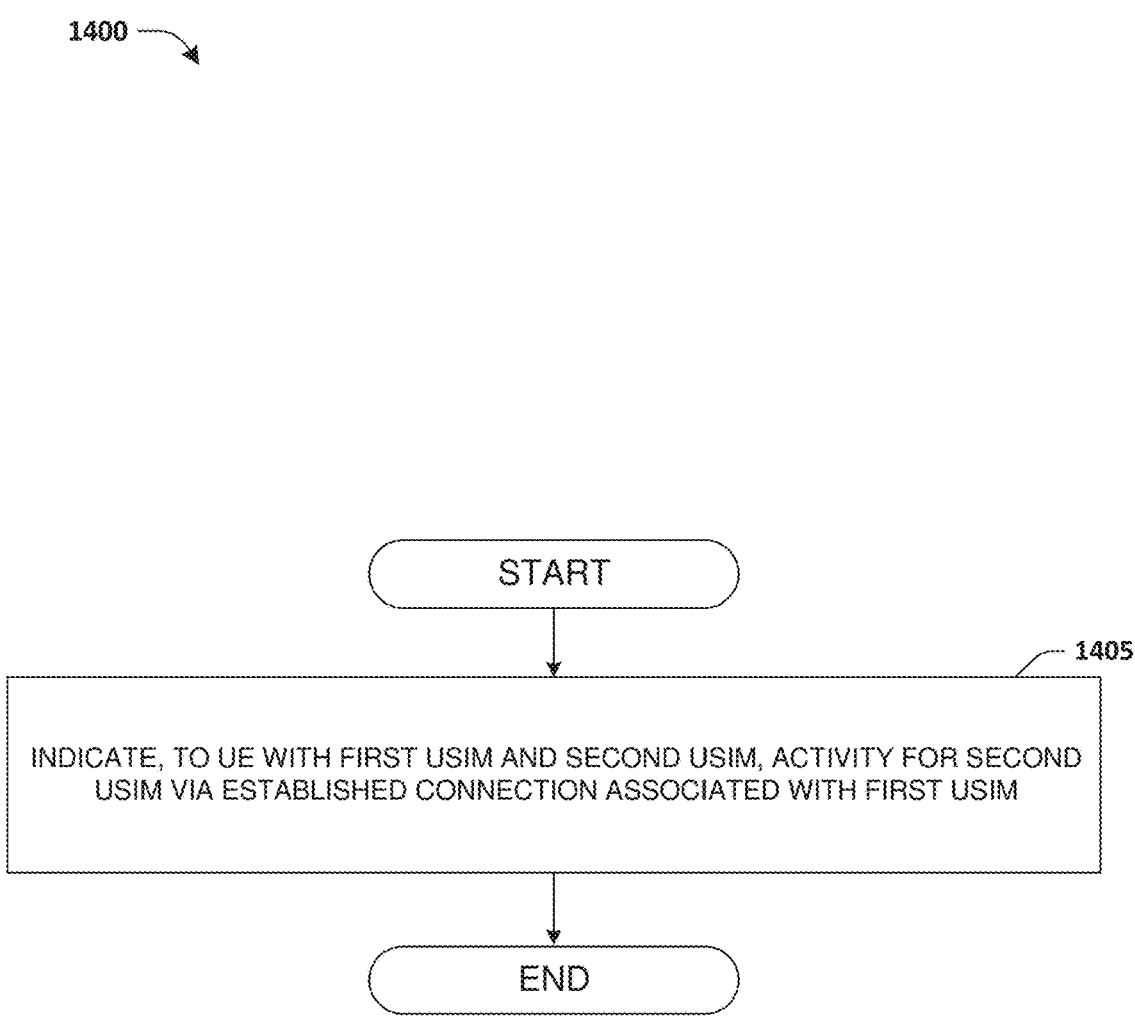
FIG. 14 is a flow chart according to one exemplary embodiment.

FIG. 14 is a flow chart 1400 according to one exemplary embodiment from the perspective of a network node. In step 1405, the network node indicates, to a UE with a first USIM and a second USIM, an activity for the second USIM via an established connection (e.g., an established RRC connection) associated with the first USIM.

Referring back to FIGS. 3 and 4, in one exemplary embodiment of a network node, the device 300 includes a program code 312 stored in the memory 310. The CPU 308 could execute program code 312 to enable the network node (i) to indicate, to a UE with a first USIM and a second USIM, an activity for the second USIM via an established connection (e.g., an established RRC connection) associated with the first USIM. Furthermore, the CPU 308 can execute the program code 312 to perform one, some and/or all of the above-described actions and steps and/or others described herein.

Figure 15:
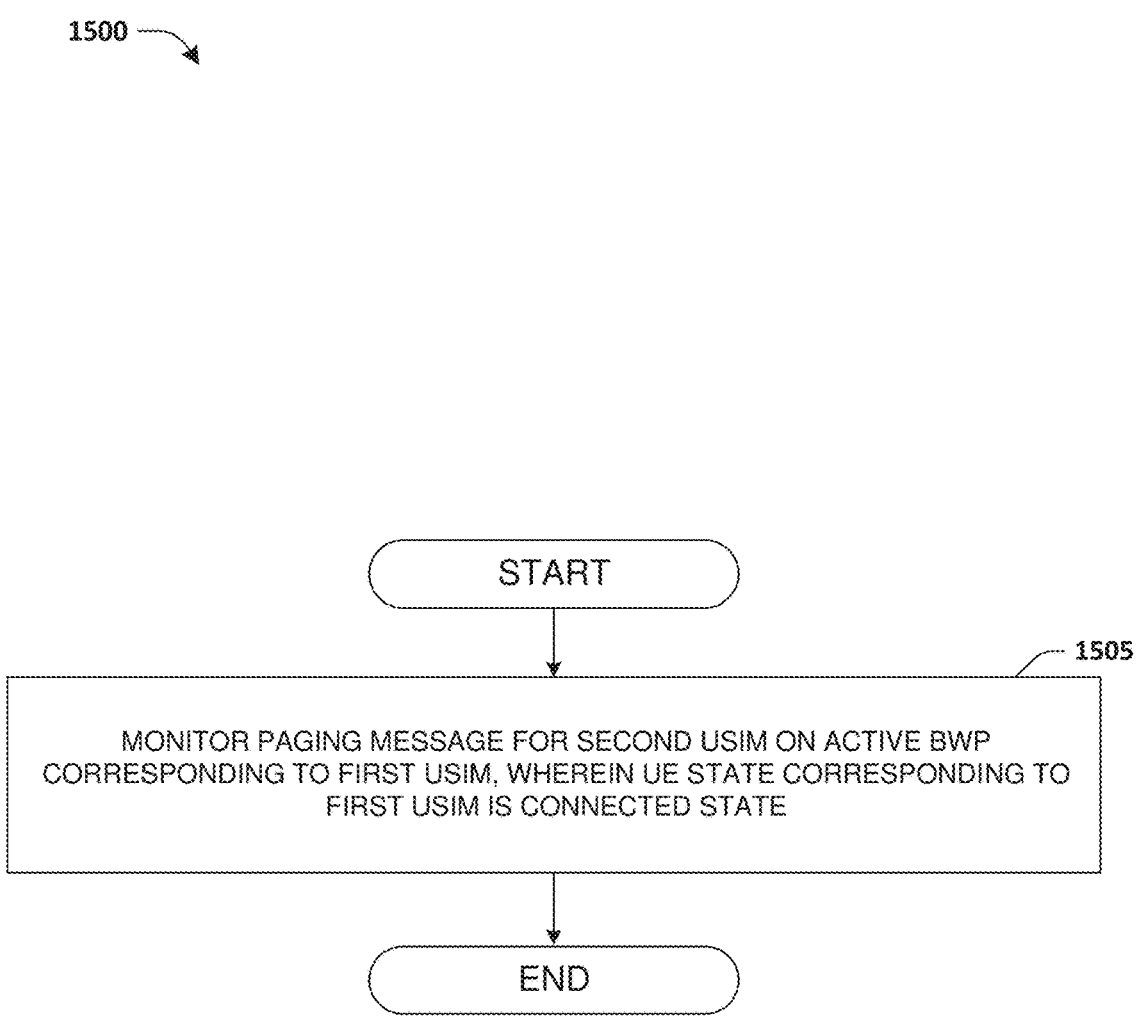
FIG. 15 is a flow chart according to one exemplary embodiment.

FIG. 15 is a flow chart 1500 according to one exemplary embodiment from the perspective of a UE with a first USIM and a second USIM. In step 1505, the UE monitors a paging message for the second USIM on an active BWP corresponding to the first USIM, wherein a UE state corresponding to the first USIM is connected state.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to monitor a paging message for the second USIM on an active BWP corresponding to the first USIM, wherein a UE state corresponding to the first USIM is connected state. Furthermore, the CPU 308 can execute the program code 312 to perform one, some and/or all of the above-described actions and steps and/or others described herein.

Figure 16:
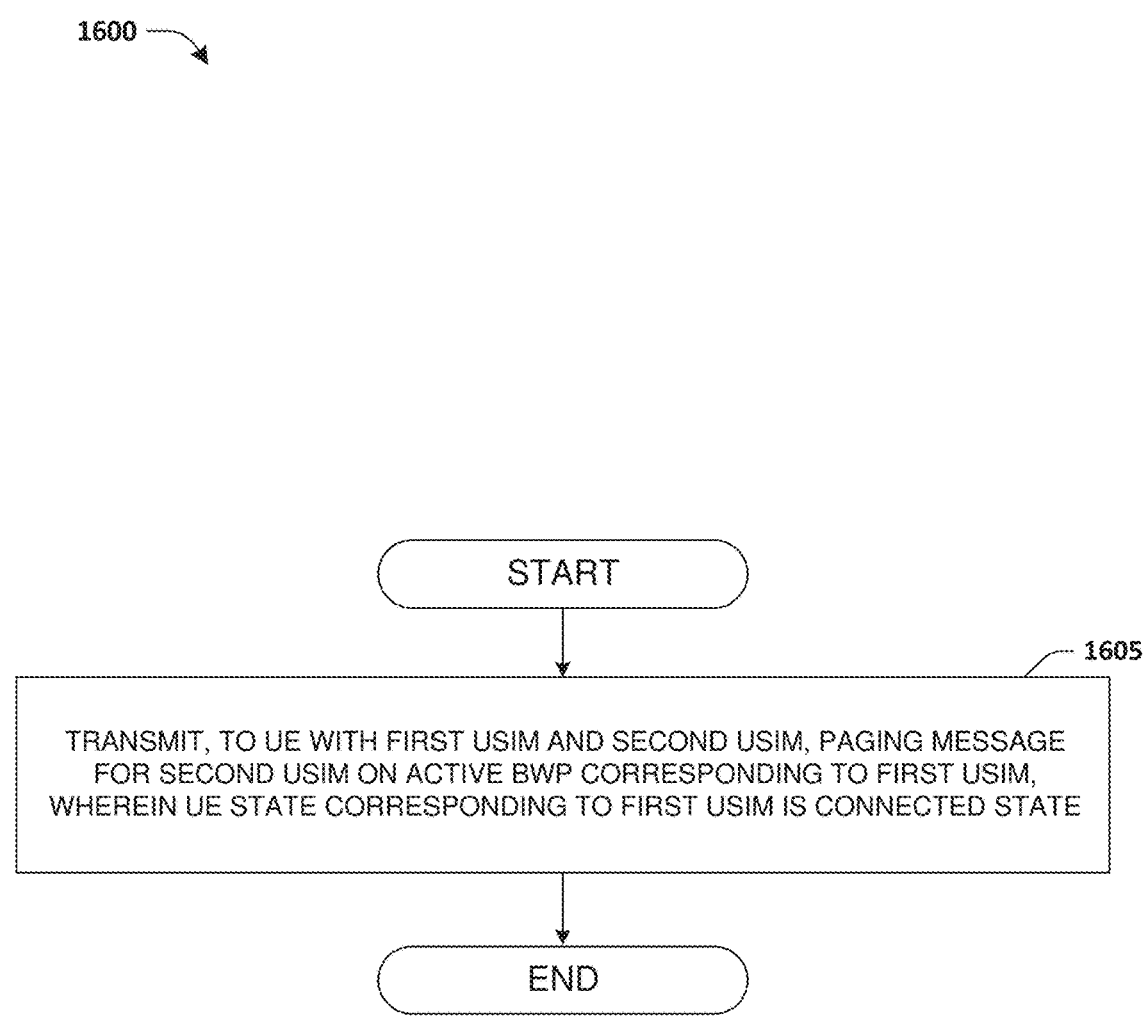
FIG. 16 is a flow chart according to one exemplary embodiment.

FIG. 16 is a flow chart 1600 according to one exemplary embodiment from the perspective of a network node. In step 1605, the network node transmits, to a UE with a first USIM and a second USIM, a paging message for the second USIM on an active BWP corresponding to the first USIM, wherein a UE state corresponding to the first USIM is connected state.

Referring back to FIGS. 3 and 4, in one exemplary embodiment of a network node, the device 300 includes a program code 312 stored in the memory 310. The CPU 308 could execute program code 312 to enable the network node (i) to transmit, to a UE with a first USIM and a second USIM, a paging message for the second USIM on an active BWP corresponding to the first USIM, wherein a UE state corresponding to the first USIM is connected state. Furthermore, the CPU 308 can execute the program code 312 to perform one, some and/or all of the above-described actions and steps and/or others described herein.

With respect to FIGS. 12-16, in one embodiment, the time domain pattern corresponds to one or more paging frames and/or one or more paging occasions (such as discussed in 3GPP TS 38.304 V15.3.0).

In one embodiment, the first UE ID is 5G-S-TMSI and/or the second UE ID is 5G-S-TMSI.

In one embodiment, the activity is mobile-terminating activity to the UE.

In one embodiment, the first USIM and the second USIM belong to the same operator.

In one embodiment, the UE state is a RRC state of the UE.

In one embodiment, the active BWP is not a default BWP.

In one embodiment, a serving cell for the first USIM is the same as a serving cell for the second USIM.

In one embodiment, a serving cell for the first USIM is different than a serving cell for the second USIM.

In one embodiment, a RAT of a serving cell for the first USIM is the same as a RAT of a serving cell for the second USIM.

In one embodiment, a RAT of a serving cell for the first USIM is different than a RAT of a serving cell for the second USIM.

In one embodiment, a tracking area for the first USIM is the same as a tracking area for the second USIM.

In one embodiment, a tracking area for the first USIM is different than a tracking area for the second USIM.

In one embodiment, a RAN notification area for the first USIM is the same as a RAN notification area for the second USIM.

In one embodiment, a RAN notification area for the first USIM is different than a RAN notification area for the second USIM.

In one embodiment, the first USIM and the second USIM belong to the same MNO.

In one embodiment, the UE state corresponding to the first USIM is connected state.

In one embodiment, the UE state corresponding to the second USIM is idle state.

In one embodiment, the UE state corresponding to the second USIM is inactive state.

In one embodiment, the network node instructs (and/or indicates to) the UE to release (and/or suspend) the connection (e.g., the established connection) associated with the first USIM.

In one embodiment, the network node instructs (and/or indicates to) the UE to establish a connection associated with the second USIM.

In one embodiment, the UE does not transmit a request to release the connection corresponding to the first USIM to the network node.

In one embodiment, the UE indicates to the network node that the first USIM and the second USIM are equipped in the same UE.

In one embodiment, the UE indicates to the network node that the UE cannot perform receptions associated with the first USIM and the second USIM at the same time.

In one embodiment, the UE indicates, to the network node, one or more preferences (e.g., one or more user preferences) associated with service prioritization.

In one embodiment, the network node is a CN node.
In one embodiment, the network node is an AMF.
In one embodiment, the network node is a RAN node.
In one embodiment, the network node is a NG-RAN node.
In one embodiment, the network node is a gNB.
In one embodiment, the network node is a NG eNB.
In one embodiment, the UE has a single receiver.
In one embodiment, the UE has a dual receiver.
In one embodiment, the paging message is a signalling transmitted on PDCCH addressed to P-RNTI.

In one embodiment, the first UE ID is an IMSI and/or the second UE ID is an IMSI.

In one embodiment, the first UE ID is a S-TMSI and/or the second UE ID is a S-TMSI.

Figure 17:
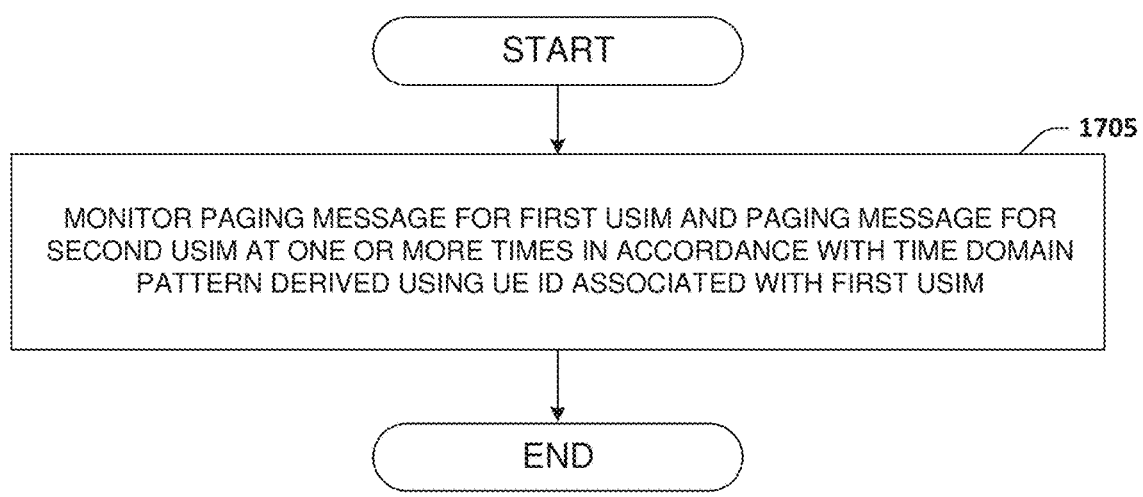
FIG. 17 is a flow chart according to one exemplary embodiment.

FIG. 17 is a flow chart 1700 according to one exemplary embodiment from the perspective of a UE with a first USIM and a second USIM. In step 1705, the UE monitors a paging message for the first USIM and a paging message for the second USIM at one or more times in accordance with a time domain pattern derived using a UE ID associated with the first USIM.

In one embodiment, the time domain pattern corresponds to one or more paging frames and/or one or more paging occasions (such as discussed in 3GPP TS 38.304 V15.3.0).

In one embodiment, the UE ID is a 5G-S-TMSI.

In one embodiment, the UE monitors the paging message in a serving cell associated with the first USIM.

In one embodiment, the UE does not monitor the paging message outside the time domain pattern (e.g., the UE does not monitor the paging message at times that are not in accordance with the time domain pattern).

In one embodiment, the one or more times may correspond to one or more paging frames and/or one or more paging occasions of the time domain pattern.

In one embodiment, the UE uses a single receiver to monitor the paging message.

In one embodiment, the first USIM and the second USIM belong to the same operator.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to monitor a paging message for the first USIM and a paging message for the second USIM at one or more times in accordance with a time domain pattern derived using a UE ID associated with the first USIM. Furthermore, the CPU 308 can execute the program code 312 to perform one, some and/or all of the above-described actions and steps and/or others described herein.

Figure 18:
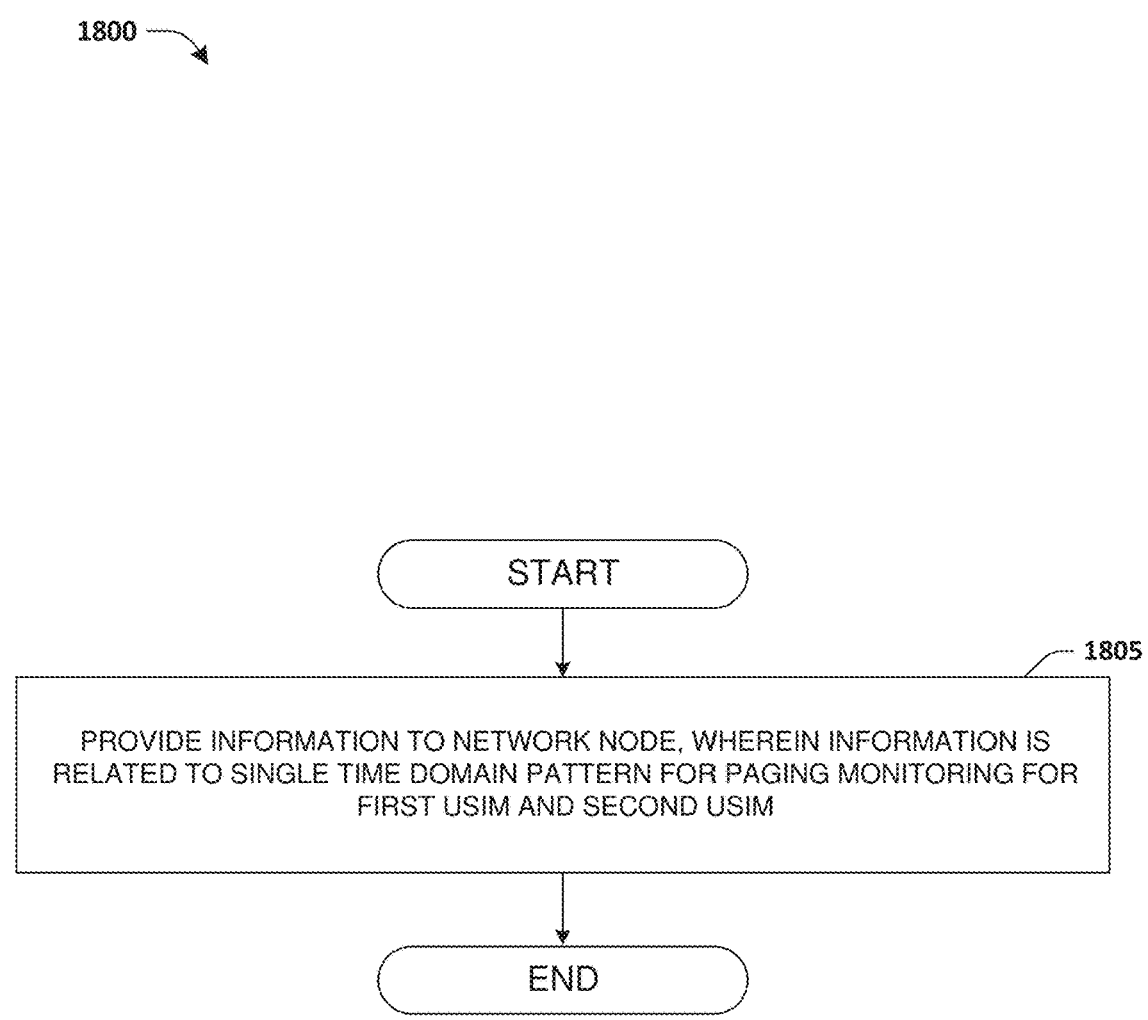
FIG. 18 is a flow chart according to one exemplary embodiment.

FIG. 18 is a flow chart 1800 according to one exemplary embodiment from the perspective of a UE with a first USIM and a second USIM. In step 1805, the UE provides information to a network node, wherein the information is related to a single time domain pattern for paging monitoring for the first USIM and the second USIM.

In one embodiment, the information indicates that the UE is capable of performing paging monitoring, in accordance with a single time domain pattern, for the first USIM and the second USIM.

In one embodiment, the information indicates a preference of the UE with respect using a single time domain pattern for performing paging monitoring for the first USIM and the second USIM. For example, the information may indicate that the UE prefers to using the single time domain pattern for performing paging monitoring for the first USIM and the second USIM. Alternatively and/or additionally, the information may indicate that the UE does not prefer to use the single time domain pattern for performing paging monitoring for the first USIM and the second USIM.

In one embodiment, the information indicates one or more USIMs of the UE that can (and/or should) share a single time domain pattern (e.g., the information may be indicative of one or more USIMs for which paging monitoring can and/or should be performed using the single time domain pattern).

In one embodiment, the information indicates one or more USIMs of the UE that will share the single time domain pattern (e.g., the information may be indicative of one or more USIMs for which paging monitoring will be performed using the single time domain pattern).

In one embodiment, the information is provided during registration to the network node.

In one embodiment, the registration is associated with the first USIM.

In one embodiment, the registration is associated with the second USIM.

In one embodiment, the information is provided during change of a registration area.

In one embodiment, the registration area is a tracking area.

In one embodiment, the registration area is a RAN notification area.

In one embodiment, the registration area is associated with the first USIM.

In one embodiment, the registration area is associated with the second USIM.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to provide information to a network node, wherein the information is related to a single time domain pattern for paging monitoring for the first USIM and the second USIM. Furthermore, the CPU 308 can execute the program code 312 to perform one, some and/or all of the above-described actions and steps and/or others described herein.

With respect to FIGS. 17-18, in one embodiment, the time domain pattern (and/or the single time domain pattern) is determined by a network node.

In one embodiment, the time domain pattern (and/or the single time domain pattern) is determined by the UE.

In one embodiment, the time domain pattern (and/or the single time domain pattern) is predefined.

In one embodiment, the time domain pattern (and/or the single time domain pattern) is determined based on one or more predefined rules.

In one embodiment, the UE transmits a request to a network node requesting the time domain pattern.

In one embodiment, the UE provides one or more preferred time domain patterns in the request (e.g., the request is indicative of the one or more preferred time domain patterns).

In one embodiment, the network node transmits a response to the UE, wherein the response indicates the time domain pattern (and/or the single time domain pattern) to be applied. The response may be transmitted by the network node in response to receiving the request from the UE.

In one embodiment, the response comprises information used to derive the time domain pattern (and/or the single time domain pattern).

In one embodiment, the information comprises a UE ID (e.g., a S-TMSI and/or a 5G-S-TMSI).

In one embodiment, the UE transmits an acknowledgement of the response to the network node.

In one embodiment, the UE transmits a signalling to indicate the time domain pattern (and/or the single time domain pattern) to a network node.

In one embodiment, the signalling comprises information used to derive the time domain pattern (and/or the single time domain pattern).

In one embodiment, the information comprises a UE ID (e.g., a S-TMSI and/or a 5G-S-TMSI).

In one embodiment, the network node transmits a response to the UE to accept or reject the time domain pattern (and/or the single time domain pattern). The response may be transmitted by the network node in response to receiving the signalling from the UE.

In one embodiment, a UE ID associated with a specific USIM of the UE is used to derive the time domain pattern (and/or the single time domain pattern).

In one embodiment, a lowest UE ID among UE IDs associated with the first USIM and the second USIM is used to derive the time domain pattern.

In one embodiment, a highest UE ID among UE IDs associated with the first USIM and the second USIM is used to derive the time domain pattern.

In one embodiment, the network node is a CN node.

In one embodiment, the network node is an AMF.

In one embodiment, the network node is a RAN node.

In one embodiment, the network node is a NG-RAN node.

In one embodiment, the network node is a gNB.

In one embodiment, the network node is a NG eNB.

In one embodiment, the UE has a single receiver.

In one embodiment, the UE has a dual receiver.

In one embodiment, the paging message is a signalling transmitted on PDCCH addressed to P-RNTI.

In one embodiment, the UE ID is an IMSI.

In one embodiment, the UE ID is a S-TMSI.

In one embodiment, the UE ID is a 5G-S-TMSI.

Figure 19:
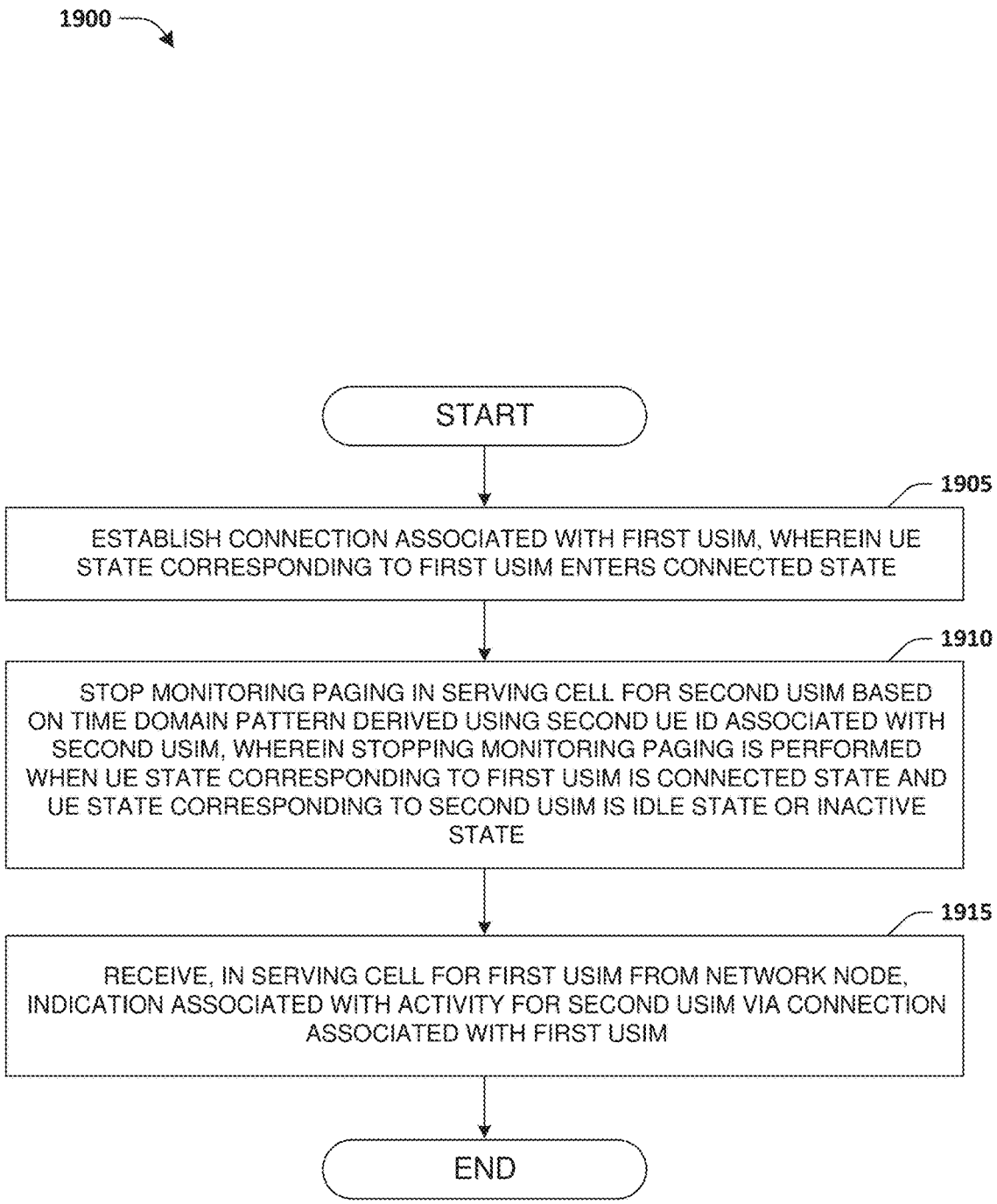
FIG. 19 is a flow chart according to one exemplary embodiment.

FIG. 19 is a flow chart 1900 according to one exemplary embodiment from the perspective of a UE with a first USIM and a second USIM. In step 1905, the UE establishes a connection associated with the first USIM, wherein a UE state corresponding to the first USIM enters connected state. For example, the UE state corresponding to the first USIM may be a state (e.g., a RRC state), of the UE, corresponding to the first USIM. The UE state corresponding to the first USIM may enter connected state when the connection associated with the first USIM is established. In step 1910, the UE stops monitoring paging in a serving cell for the second USIM based on a time domain pattern derived using a second UE ID associated with the second USIM, wherein the stopping monitoring paging is performed when the UE state corresponding to the first USIM is connected state and a UE state corresponding to the second USIM is idle state or inactive state. In step 1915, the UE receives, in a serving cell for the first USIM from a network node, an indication associated with activity for the second USIM via the connection associated with the first USIM.

In one embodiment, the indication is included in a dedicated RRC message.

In one embodiment, the dedicated RRC message is used to release and/or suspend the connection associated with the first USIM.

In one embodiment, the dedicated RRC message comprises the second UE ID.

In one embodiment, the indication instructs (and/or indicates to) the UE to establish a connection corresponding to the second USIM.

In one embodiment, the UE transmits, to the network node, an association between the second UE ID and a first UE ID associated with the first USIM.

In one embodiment, the time domain pattern corresponds to (and/or comprises) one or more paging frames and/or one or more paging occasions.

In one embodiment, the activity is mobile-terminating activity to the UE.

In one embodiment, the network node is an AMF.

In one embodiment, before the UE establishes the connection associated with the first USIM (and/or before the UE state corresponding to the first USIM enters connected state), the UE monitors paging in the serving cell for the second USIM based on the time domain pattern derived using the second UE ID associated with the second USIM. The monitoring paging is performed when the UE state corresponding to the first USIM is idle state or inactive state. The monitoring paging is performed when the UE state corresponding to the second USIM is idle state or inactive state.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to establish a connection associated with the first USIM, wherein a UE state corresponding to the first USIM enters connected state, (ii) to stop monitoring paging in a serving cell for the second USIM based on a time domain pattern derived using a second UE ID associated with the second USIM, wherein the stopping monitoring paging is performed when the UE state corresponding to the first USIM is connected state and a UE state corresponding to the second USIM is idle state or inactive state, and (iii) to receive, in a serving cell for the first USIM from a network node, an indication associated with activity for the second USIM via the connection associated with the first USIM. Furthermore, the CPU 308 can execute the program code 312 to perform one, some and/or all of the above-described actions and steps and/or others described herein.

Figure 20:
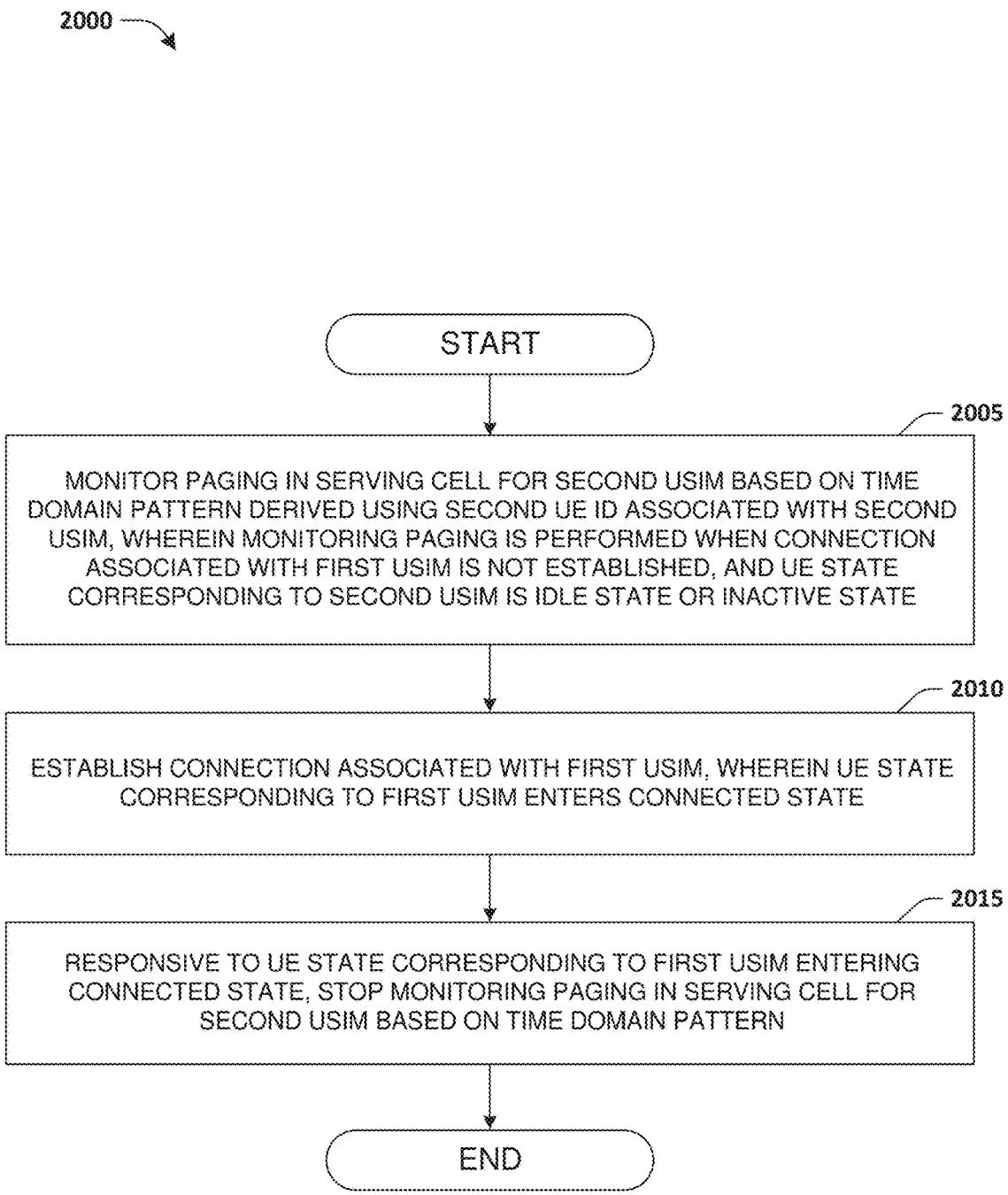
FIG. 20 is a flow chart according to one exemplary embodiment.

FIG. 20 is a flow chart 2000 according to one exemplary embodiment from the perspective of a UE with a first USIM and a second USIM. In step 2005, the UE monitors paging in a serving cell for the second USIM based on a time domain pattern derived using a second UE ID associated with the second USIM, wherein the monitoring paging is performed when a UE state corresponding to the second USIM is idle state or inactive state and a connection associated with the first USIM is not established (e.g., the monitoring paging may be performed before a connection associated with the first USIM is established), such as when a UE state corresponding to the first USIM is idle state or inactive state. For example, the UE state corresponding to the second USIM may be a state (e.g., a RRC state), of the UE, corresponding to the second USIM. Alternatively and/or additionally, the UE state corresponding to the first USIM may be a state (e.g., a RRC state), of the UE, corresponding to the first USIM. In step 2010, the UE establishes a connection associated with the first USIM, wherein the UE state corresponding to the first USIM enters connected state. The UE state corresponding to the first USIM may enter connected state when the connection associated with the first USIM is established. In step 2015, responsive to the UE state corresponding to the first USIM entering connected state, the UE stops the monitoring paging in the serving cell for the second USIM based on the time domain pattern.

In one embodiment, after the UE stops the monitoring paging in the serving cell for the second USIM based on the time domain pattern, the UE receives, in a serving cell for the first USIM from a network node, an indication associated with activity for the second USIM via the connection associated with the first USIM.

In one embodiment, the indication is included in a dedicated RRC message.

In one embodiment, the UE state corresponding to the second USIM is idle state or inactive state when the UE stops the monitoring paging in the serving cell for the second USIM based on the time domain pattern.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to monitor paging in a serving cell for the second USIM based on a time domain pattern derived using a second UE ID associated with the second USIM, wherein the monitoring paging is performed when a connection associated with the first USIM is not established and a UE state corresponding to the second USIM is idle state or inactive state, (ii) to establish a connection associated with the first USIM, wherein a UE state corresponding to the first USIM enters connected state, and (iii) responsive to the UE state corresponding to the first USIM entering connected state, to stop the monitoring paging in the serving cell for the second USIM based on the time domain pattern. Furthermore, the CPU 308 can execute the program code 312 to perform one, some and/or all of the above-described actions and steps and/or others described herein.

Figure 21:
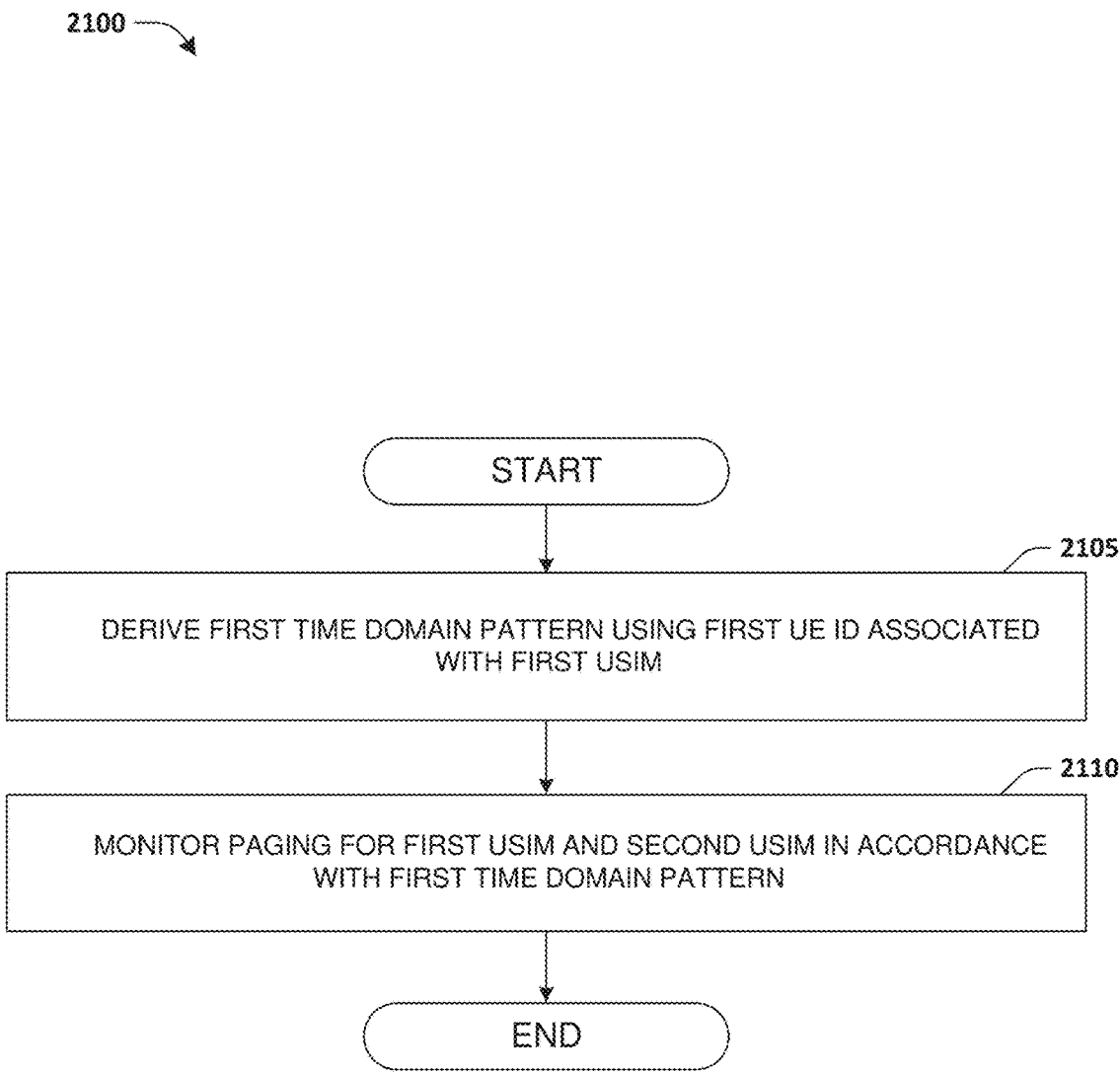
FIG. 21 is a flow chart according to one exemplary embodiment.

FIG. 21 is a flow chart 2100 according to one exemplary embodiment from the perspective of a UE with a first USIM and a second USIM. In step 2105, the UE derives a first time domain pattern using a first UE ID associated with the first USIM. In step 2110, the UE monitors paging for the first USIM and the second USIM in accordance with the first time domain pattern.

In one embodiment, the monitoring paging for the first USIM and the second USIM is performed at at least one of one or more paging frames or one or more paging occasions corresponding to the first time domain pattern.

In one embodiment, the first UE ID is a TMSI (e.g., a S-TMSI and/or a 5G-S-TMSI).

In one embodiment, the monitoring paging for the first USIM and the second USIM is performed using a single receiver of the UE.

In one embodiment, the first USIM and the second USIM belong to a single operator.

In one embodiment, the UE transmits a request for a time domain pattern to a network node, and receives, from the network node, a response to the request, wherein the response comprises the first UE ID.

In one embodiment, the deriving the first time domain pattern based on the first UE ID is performed based on the response comprising the first UE ID.

In one embodiment, responsive to receiving the response, the UE transmits an acknowledgment of the response to the network node.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to derive a first time domain pattern using a first UE ID associated with the first USIM, and (ii) to monitor paging for the first USIM and the second USIM in accordance with the first time domain pattern. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 12-21. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 12-21, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node), such as where a first device of the devices comprises multiple USIMs and cannot perform receptions associated with the multiple USIMs at the same time. The increased efficiency may be a result of enabling the first device to stop monitoring paging for a first USIM when a state corresponding to a second USIM is connected state such that the first device does not interrupt a currently ongoing service (associated with the second USIM) by monitoring paging and/or the first device avoids service interruptions on the currently ongoing service.

Alternatively and/or additionally, applying one or more of the techniques presented herein may result in one or more benefits including improved efficiency and/or reduced power consumption of a multi-USIM device (e.g., as a result of using a common time domain pattern for monitoring paging for multiple USIMs), in comparison with other multi-USIM devices that use separate and/or independent time domain patterns for monitoring paging for different USIMs. Further, using the common time domain pattern for monitoring paging for the multiple USIMs may cause a reduction in paging collision (e.g., as a result of performing paging monitoring and/or paging transmission for the multiple USIMs using the same time-frequency resources).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) with a first Universal Subscriber Identity Module (USIM) and a second USIM, the method comprising:
    establishing a connection associated with the first USIM, wherein a UE state corresponding to the first USIM enters connected state;
    stopping monitoring paging in a serving cell for the second USIM based on a time domain pattern derived using a second UE Identifier (UE ID) associated with the second USIM, wherein the stopping monitoring paging is performed when the UE state corresponding to the first USIM is connected state and a UE state corresponding to the second USIM is idle state or inactive state; and
    receiving, in a serving cell for the first USIM from a network node, an indication associated with activity for the second USIM via the connection associated with the first USIM.

2. The method of claim 1, wherein:
the indication is included in a dedicated Radio Resource Control (RRC) message.

3. The method of claim 2, wherein:
the dedicated RRC message is used to at least one of release or suspend the connection associated with the first USIM.

4. The method of claim 2, wherein:
the dedicated RRC message comprises the second UE ID.

5. The method of claim 1, wherein:
the indication instructs the UE to establish a connection corresponding to the second USIM.

6. The method of claim 1, further comprising:
transmitting, to the network node, an association between the second UE ID and a first UE ID associated with the first USIM.

7. The method of claim 1, wherein:
the time domain pattern corresponds to at least one of one or more paging frames or one or more paging occasions.

8. The method of claim 1, wherein:
the activity is mobile-terminating activity to the UE.

9. The method of claim 1, wherein:
the network node is an Access and Mobility Management Function (AMF).

10. The method of claim 1, further comprising:
prior to the establishing the connection associated with the first USIM, monitoring paging in the serving cell for the second USIM based on the time domain pattern derived using the second UE ID associated with the second USIM, wherein the monitoring paging is performed when the UE state corresponding to the first USIM is idle state or inactive state and the UE state corresponding to the second USIM is idle state or inactive state.

11. A User Equipment (UE) with a first Universal Subscriber Identity Module (USIM) and a second USIM, comprising:
    a control circuit;
    a processor installed in the control circuit; and
    a memory installed in the control circuit and operatively coupled to the processor, wherein the processor is configured to execute a program code stored in the memory to perform operations, the operations comprising:
        establishing a connection associated with the first USIM, wherein a UE state corresponding to the first USIM enters connected state;
        stopping monitoring paging in a serving cell for the second USIM based on a time domain pattern derived using a second UE Identifier (UE ID) associated with the second USIM, wherein the stopping monitoring paging is performed when the UE state corresponding to the first USIM is connected state and a UE state corresponding to the second USIM is idle state or inactive state; and
        receiving, in a serving cell for the first USIM from a network node, an indication associated with activity for the second USIM via the connection associated with the first USIM.

12. The UE of claim 11, wherein:
the indication is included in a dedicated Radio Resource Control (RRC) message.

13. The UE of claim 12, wherein:
the dedicated RRC message is used to at least one of release or suspend the connection associated with the first USIM.

14. The UE of claim 12, wherein:
the dedicated RRC message comprises the second UE ID.

15. The UE of claim 11, wherein:
the indication instructs the UE to establish a connection corresponding to the second USIM.

16. The UE of claim 11, the operations further comprising:
transmitting, to the network node, an association between the second UE ID and a first UE ID associated with the first USIM.

17. The UE of claim 11, wherein:
the time domain pattern corresponds to at least one of one or more paging frames or one or more paging occasions.

18. The UE of claim 11, wherein:
the activity is mobile-terminating activity to the UE.

19. The UE of claim 11, wherein:
the network node is an Access and Mobility Management Function (AMF).

20. The UE of claim 11, the operations further comprising:
prior to the establishing the connection associated with the first USIM, monitoring paging in the serving cell for the second USIM based on the time domain pattern derived using the second UE ID associated with the second USIM, wherein the monitoring paging is performed when the UE state corresponding to the first USIM is idle state or inactive state and the UE state corresponding to the second USIM is idle state or inactive state.

* * * * *